US009168513B2

(12) United States Patent
Mueller et al.

(10) Patent No.: US 9,168,513 B2
(45) Date of Patent: Oct. 27, 2015

(54) PROCESS FOR PREPARATION OF ZEOLITIC MATERIAL

(71) Applicant: BASF SE, Ludwigshafen (DE)

(72) Inventors: Ulrich Mueller, Neustadt (DE);
Andrei-Nicolae Parvulescu, Heidelberg (DE); Jeff Yang, Mannheim (DE);
Hans-Juergen Luetzel, Boehl-Iggelheim (DE); Georg Uhl, Kaiserslautern (DE);
Stefan Dumser, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 327 days.

(21) Appl. No.: 13/759,573

(22) Filed: Feb. 5, 2013

(65) Prior Publication Data
US 2013/0202523 A1    Aug. 8, 2013

Related U.S. Application Data

(60) Provisional application No. 61/595,705, filed on Feb. 7, 2012, provisional application No. 61/715,368, filed on Oct. 18, 2012.

(51) Int. Cl.
C01B 39/02    (2006.01)
B01J 29/86    (2006.01)
B01J 29/04    (2006.01)
B01J 29/89    (2006.01)
B01J 29/70    (2006.01)
B01J 35/00    (2006.01)
C01B 39/12    (2006.01)

(52) U.S. Cl.
CPC .............. *B01J 29/04* (2013.01); *B01J 29/7038* (2013.01); *B01J 29/7088* (2013.01); *B01J 29/86* (2013.01); *B01J 29/89* (2013.01); *B01J 35/002* (2013.01); *C01B 39/026* (2013.01); *C01B 39/12* (2013.01); *B01J 2229/18* (2013.01); *B01J 2229/30* (2013.01); *B01J 2229/37* (2013.01)

(58) Field of Classification Search
CPC ........ B01J 29/04; B01J 29/7088; B01J 29/86; B01J 29/7038; B01J 35/002; B01J 2229/18; B01J 2229/30; B01J 2229/37; B01J 29/89; C01B 39/026; C01B 39/12
See application file for complete search history.

(56) References Cited

U.S. PATENT DOCUMENTS

| 4,503,024 | A | * | 3/1985 | Bourgogne et al. | ........... 423/709 |
| 4,526,880 | A | | 7/1985 | Chu et al. | |
| 4,954,325 | A | | 9/1990 | Rubin et al. | |
| 5,047,141 | A | | 9/1991 | Chu | |
| 5,053,211 | A | | 10/1991 | Haddad | |
| 5,225,179 | A | * | 7/1993 | Zones et al. | ................... 423/709 |
| 5,324,702 | A | * | 6/1994 | Yoo et al. | ....................... 502/204 |
| 5,512,267 | A | * | 4/1996 | Davis et al. | ..................... 423/705 |
| 5,968,473 | A | * | 10/1999 | Valencia et al. | ............... 423/702 |
| 6,306,364 | B1 | * | 10/2001 | Valencia et al. | ............... 423/713 |
| 7,326,401 | B2 | * | 2/2008 | Tatsumi et al. | ................ 423/713 |
| 2003/0133870 | A1 | * | 7/2003 | Chen et al. | ....................... 423/713 |
| 2004/0092757 | A1 | * | 5/2004 | Oguchi et al. | ................. 549/533 |
| 2005/0169836 | A1 | * | 8/2005 | Jones et al. | ..................... 423/713 |
| 2005/0209091 | A1 | | 9/2005 | Tatsumi et al. | |
| 2006/0105903 | A1 | | 5/2006 | Tatsumi et al. | |
| 2011/0313226 | A1 | | 12/2011 | Yilmaz et al. | |

FOREIGN PATENT DOCUMENTS

| DE | 198 28 851 A1 | 2/2000 |
| EP | 0 234 759 A1 | 9/1987 |
| EP | 1 324 948 | 7/2003 |
| EP | 1 490 300 B1 | 4/2009 |
| EP | 1 485 321 B1 | 4/2010 |
| WO | 02/28774 A2 | 4/2002 |
| WO | 02/057181 A2 | 7/2002 |
| WO | WO 03/074421 A1 | 9/2003 |
| WO | WO 2004/069746 A1 | 8/2004 |

OTHER PUBLICATIONS

Bakkua et al, Introduction to Zeolite Science and Practice, 1991, p. 508.*
International Search Report and Written Opinion issued Apr. 2, 2013 in PCT/EP2013/052224 filed Feb. 5, 2013.
Peng Wu, et al., "Preparation of B-free Ti-MWW through reversible structural conversion", Chem. Commun., XP002533316, 2002, pp. 1026-1027.
P. Wu, et al., "MWW-Type Titanosilicate: Novel Preparation and High Efficiency in the Epoxidation of Various Alkenes", Studies in Surface Science and Catalysis, vol. 154, 2004, pp. 2581-2588.
Peng Wu, et al., "Preparation of B-free Ti-MWW through reversible structural conversion", Chemical Communication, 2002, pp. 1026-1027.
Lin Liu, et al., "Synthesis, characterization, and catalytic properties of MWW zeolite with variable Si/Al ratios", Microporous and Mesoporous Materials, vol. 94, 2006, pp. 304-312.
Michael E. Leonowicz, et al., "MCM-22: A Molecular Sieve with Two Independent Multidimensional Channel Systems", Science, vol. 264, Jun. 24, 1994, pp. 1910-1913.
S.L. Lawton, et al., "Twelve-ring pockets on the external surface on MCM-22 crystals", Microporous and Mesoporous Materials, vol. 23, 1998, pp. 109-117.
Peng Wu, et al., "Hydrothermal Synthesis of a Novel Titanosilicate with MWW Topology", Chemisty Letters, 2000, pp. 774-775.

* cited by examiner

Primary Examiner — David M Brunsman
(74) Attorney, Agent, or Firm — Oblon, McClelland, Maier & Neustadt, L.L.P.

(57) ABSTRACT

The present invention relates to a process for process for the preparation of a zeolitic material which process comprises (i) providing a boron-containing zeolitic material and (ii) deboronating the boron-containing zeolitic material by treating the boron-containing zeolitic material with a liquid solvent system thereby obtaining a deboronated zeolitic material, which liquid solvent system does not contain an inorganic or organic acid, or a salt thereof.

22 Claims, 6 Drawing Sheets

PROCESS FOR PREPARATION OF ZEOLITIC MATERIAL

The present invention relates to a process for the preparation of a zeolitic material wherein a boron-containing zeolitic material, preferably of structure type MWW, BEA, MFI, CHA, MOR, MTW, RUB, LEV, FER, MEL, RTH, more preferably of structure type MWW, referred to herein as B-Zeolite, in particular B-MWW, B-BEA, B-MFI, B-CHA, B-MOR, B-MTW, B-RUB, B-LEV, B-FER, B-MEL, B-RTH and B-MWW, is subjected to deboronation, thereby obtaining a deboronated B-Zeolite, preferably a deboronated B-MWW, B-BEA, B-MFI, B-CHA, B-MOR, B-MTW, B-RUB, B-LEV, B-FER, B-MEL, B-RTH, more preferably a deboronated B-MWW, referred to herein as MWW, BEA, MFI, CHA, MOR, MTW, RUB, LEV, FER, MEL, RTH, by treating with a liquid solvent system which is selected from the group consisting of water, monohydric alcohols, polyhydric alcohols, and mixtures of two or more thereof, preferably water, and which does not contain specific acids, and which in particular contains neither an inorganic acid nor an organic acid, nor a salt of an inorganic acid or an organic acid. Further, the present invention relates to said process which further comprises introducing at least one heteroatom, in particular one or two heteroatoms into the MWW. Yet further, the present invention relates to the zeolitic material obtainable or obtained by this process, and the use of this zeolitic material, in particular as catalytically active agent. Still further, the present invention relates to specific zeolitic materials comprising at least two heteroatoms.

Crystalline silicates, in particular those having zeolitic structure, are used in numerous technical applications. Among others, zeolites are employed as catalytically active agents for the preparation of chemical compounds or as molecular sieves, for example for separating chemical compounds from a respective mixture. Such technical processes are performed in laboratory scale, in pilot plant scale, and in industrial scale. In particular as far as the pilot plant and industrial scale processes are concerned where comparatively high amounts of zeolitic materials are employed, it is generally desired to prepare the zeolitic materials in an ecologically and economically advantageous manner.

A known method for the preparation of zeolitic materials comprises the preparation of a borosilicate having zeolitic structure, and a subsequent deboronation step where at least a portion of the boron is removed from the zeolitic framework. Such deboronated zeolitic materials can be used as such, or optionally subjected to further steps where heteroatoms are introduced into the material. Further, it is well-known that for such deboronation, harsh conditions have to be applied wherein, for example, the borosilicate is subjected to a steam treatment, to an acid treatment, and/or to a time-consuming process involving several individual treatment steps which are necessary to achieve the desired reduction of the boron content of the zeolitic material.

For zeolitic materials having zeolite structure MWW and containing titanium as heteroatom, referred to herein as TiMWW, such a process is described in EP 1 485 321 A1. According to this process, a boron containing, aluminum-free silicate is prepared and subjected to a deboronation stage according to which boron is removed from the silicate by treatment with an acid. In particular, it is disclosed that the boron containing silicate is brought into contact with an aqueous solution of inorganic acids such as hydrochloric acid, sulfuric acid, nitric acid, or phosphoric acid, or of organic acids such as formic acid, acetic acid, propionic acid, or tartaric acid. According to the specific examples of EP 1 485 321 A1, the use of the strong inorganic acid nitric acid is preferred.

According to the scientific literature, the deboronation of B-MWW is more or less exclusively carried out by treatment of the B-MWW with highly concentrated and highly corrosive nitric acid. Reference is made, for example, to P. Wu et al., Studies in Surface Science and Catalysis, vol. 154 (2004), pp. 2581-2588.

Thus, according to the established process for deboronating a B-MWW zeolite, high amounts of an acid are employed which require a high standard of safety measures.

This is also confirmed in WO 02/057181 A2 where, for the deboronation of a silicate, an acid is employed. According to the specific examples, glacial acetic acid is employed, and according to conceivable embodiments which are not further concretized, hydrochloric acid, sulfuric acid, nitric acid, phosphoric acid, formic acid, acetic acid, propionic acid, oxalic acid, and tartaric acid are described.

The fact that the prior art teaches the acid-treatment as the method of choice for the deboronation of boron containing silicates is further exemplified in EP 1 490 300 A1 and in US 2006105903 A1 where in particular in the examples, the use of highly concentrated nitric acid is described. Further, reference is made to P. Wu et al., Chemical Communications (2002), pp. 1026-1027 where the use of highly concentrated nitric acid is also taught for the deboronation of a boron containing silicate. The same is taught in L. Liu et al., Microporous and Mesoporous Materials vol. 94 (2006) pp. 304-312 where deboronation by a combination of calcination and treatment with a concentrated nitric acid is described.

Further, the examples of EP 1 324 948 A1 show that for removing boron from a boron containing silicate, drastic reaction conditions have to be applied in that highly concentrated nitric acid or sulfuric acid are employed, which teaching is in line with the disclosure of the above-referenced documents. According to a general disclosure of EP 1 324 948 A1, and for the specific case of a titanium silicate, steam may be useful for removing at least a portion of boron or aluminum from a respective boron containing or aluminum containing silicate. According to this teaching, the drastic process conditions of the acid treatment may be replaced by another drastic process condition, namely the use of steam. In particular as far as industrial-scale processes are concerned, the use of steam necessarily requires the production of steam, prior to a possible treatment of the boron containing or aluminum containing silicate, which production of steam in turn also requires increased standards of the safety measures.

Therefore, it was an object of the present invention to provide a process for the preparation of a zeolitic material starting from a boron containing zeolitic material, referred to hereinunder as "B-Zeolite", preferably of structure type MWW (B-MWW), BEA (B-BEA), MFI (B-MFI), CHA (B-CHA), MOR (B-MOR), MTW (B-MTW), RUB (B-RUB), LEV (B-LEV), FER (B-FER), MEL (B-MEL), RTH (B-RTH), more preferably of structure type MWW (B-MWW), wherein for deboronating the B-Zeolite, preferably the B-MWW, B-BEA, B-MFI, B-CHA, B-MOR, B-MTW, B-RUB, B-LEV, B-FER, B-MEL, B-RTH, more preferably the B-MWW, wherein none of the harsh reaction conditions as taught in the prior art is employed, in particular no acid treatment and/or no steam treatment.

It was a further object of the present invention to provide a process for the preparation of a zeolitic material starting from a boron containing zeolitic material, referred to hereinunder as "B-Zeolite", preferably of structure type MWW (B-MWW), BEA (B-BEA), MFI (B-MFI), CHA (B-CHA), MOR (B-MOR), MTW (B-MTW), RUB (B-RUB), LEV (B-LEV), FER (B-FER), MEL (B-MEL), RTH (B-RTH), more preferably of structure type MWW (B-MWW), wherein for deboronating the B-Zeolite, preferably the B-MWW, B-BEA, B-MFI, B-CHA, B-MOR, B-MTW, B-RUB, B-LEV, B-FER, B-MEL, B-RTH, more preferably the B-MWW, wherein the treatment conditions are ecologically and economically advantageous and thus, in particular, suitable for a large-scale industrial production.

Surprisingly, it was found that such deboronation can be accomplished by subjecting a B-Zeolite, preferably a B-MWW, B-BEA, B-MFI, B-CHA, B-MOR, B-MTW, B-RUB, B-LEV, B-FER, B-MEL, B-RTH, more preferably a B-MWW to a solvent system which is liquid, i.e. which is not in the form of steam, and which does not contain the acids as taught in the prior art, which process is highly advantageous from an ecological and economical point of view.

Therefore, the present invention relates to a process for the preparation of a zeolitic material, and a zeolitic material obtainable and/or obtained by this process, said process comprising
(i) providing a boron-containing zeolitic material (B-Zeolite), preferably either a boron-containing zeolitic material of structure type MWW (B-MWW) or a boron-containing zeolitic material which is not a boron-containing zeolitic material of structure type MWW (B-MWW), more preferably of structure type MWW (B-MWW), BEA (B-BEA), MFI (B-MFI), CHA (B-CHA), MOR (B-MOR), MTW (B-MTW), RUB (B-RUB), LEV (B-LEV), FER (B-FER), MEL (B-MEL), or RTH (B-RTH);
(ii) deboronating the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, B-RTH by treating the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, B-RTH with a liquid solvent system thereby obtaining a deboronated B-Zeolite, preferably either a deboronated B-MWW (MWW) or a deboronated B-Zeolite (Zeolite) which is not MWW, more preferably a deboronated B-MWW (MWW), B-BEA (BEA), B-MFI (MFI), B-CHA (CHA), B-MOR (MOR), B-MTW (MTW), B-RUB (RUB), B-LEV (LEV), B-FER (FER), B-MEL (MEL), B-RTH (RTH);
wherein the liquid solvent system is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, acetic acid, propionic acid, oxalic acid, and tartaric acid.

Therefore, the present invention more preferably relates to a process for the preparation of a zeolitic material, and a zeolitic material obtainable and/or obtained by this process, said process comprising
(i) providing a boron-containing zeolitic material of structure type MWW (B-MWW);
(ii) deboronating the B-MWW by treating the B-MWW with a liquid solvent system thereby obtaining a deboronated B-MWW (MWW);
wherein the liquid solvent system is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, acetic acid, propionic acid, oxalic acid, and tartaric acid.

Generally, it is conceivable that the process according to the present invention can be carried out using a boron-containing zeolitic material or a mixture of two or more boron-containing zeolitic materials having a framework structure type according to the following three-letter codes: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ER1, ESV, ETR, EUO, FAU, FER, FRA, GIS, GIU, GME, GON, GOO, HEU, IFR, ISV, ITE, ITH, ITW, IWR, IWW, JBW, KFI, LAU, LEV, LIO, LOS, LOV, LTA, LTL, LTN, MAR, MAZ, MEI, MEL, MEP, MER, MMFI, MFS, MON, MOR, MSO, MTF, MTN, MTT, MTW, MWW, NAB, NAT, NEES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN SFO, SGT, SOD, SSY, STF, STI, STT, TER, THO, TON, TSC, UEI, UFI, UOZ, USI, UTL, VET, VFI, VNI, VSV, WEI, WEN, YUG and ZON. Regarding the three-letter codes and their definitions, reference is made to the "Atlas of Zeolite Framework Types", 5$^{th}$ edition, Elsevier, London, England (2001)." MWW, BEA, MFI, CHA, MOR, MTW, RUB, LEV, FER, MEL, and RTH are preferred, and MWW, BEA and CHA are more preferred. MWW is most preferred.

Step (i)

According to step (i), a boron-containing zeolitic material, preferably either a boron-containing zeolitic material of structure type MWW (B-MWW) or a boron-containing zeolitic material which is not a boron-containing zeolitic material of structure type MWW (B-MWW), more preferably of structure type MWW (B-MWW), BEA (B-BEA), MFI (B-MFI), CHA (B-CHA), MOR (B-MOR), MTW (B-MTW), RUB (B-RUB), LEV (B-LEV), FER (B-FER), MEL (B-MEL), RTH (B-RTH), more preferably of structure type MWW (B-MWW) is provided. According to an embodiment of the present invention, the boron-containing zeolitic material provided in (i) is not B-MFI, and preferably according to this embodiment, a boron containing zeolitic material of structure type MWW (B-MWW), BEA (B-BEA), CHA (B-CHA), MOR (B-MOR), MTW (B-MTW), RUB (B-RUB), LEV (B-LEV), FER (B-FER), MEL (B-MEL), RTH (B-RTH), more preferably of structure type MWW (B-MWW) is provided in (i).

Zeolites of structure type MWW, such as zeolites MCM-22, possess two independent pore systems. One system consists of two-dimensional sinusoidal 10-member ring (MR) channels with an elliptical ring cross section of 4.1 Angstrom×5.1 Angstrom. The other system is composed of large 12-MR super-cage connected by 10-MR windows. As to this structure type MWW, reference is made, for example, to M. K. Rubin, P. Chu, U.S. Pat. No. 4,954,325, M. E. Leonowicz, J. A. Lawton, S. L. Lawton, M. K. Rubin, Science, vol. 264 (1994) pp. 1910, or S. L. Lawton, M. E. Leonowicz, R. D. Partidge, P. Chu, M. K. Rubin, Micropor. Mesopor. Mater., Vol. 23 (1998) pp. 109. Further details regarding the structure type MWW may be found in W. M. Meier, D. H. Olson and Ch. Baerlocher "Atlas of Zeolite Structure Types", Elsevier, 5th edition, pages 202 and 203, Amsterdam, 2001.

The term "boron-containing zeolitic material", in particular the term "boron-containing zeolitic material of structure type MWW, BEA, MFI, CHA, MOR, MTW, RUB, LEV, FER, MEL, RTH", especially the term "boron-containing zeolitic material of structure type MWW" as used in the context of the present invention describes a silicate which preferably has zeolitic structure type MWW, BEA, MFI, CHA, MOR, MTW, RUB, LEV, FER, MEL, or RTH, more preferably MWW, and which has a zeolitic framework in which a portion of the silicon atoms is replaced by boron atoms. Apart from silicon, oxygen, and boron, the B-Zeolite, preferably the B-MWW, B-BEA, B-MFI, B-CHA, B-MOR, B-MTW, B-RUB, B-LEV, B-FER, B-MEL, B-RTH, more preferably the B-MWW may contain further elements such as further tetravalent or trivalent elements like aluminum, zirconium, vanadium, tin, iron, cobalt, nickel, gallium, germanium, and/or chromium. According to an especially preferred embodiment of the present invention, the B-Zeolite, preferably the B-MWW, B-BEA, B-MFI, B-CHA, B-MOR, B-MTW, B-RUB, B-LEV, B-FER, B-MEL, B-RTH, more preferably the B-MWW provided in (i) essentially consists of silicon, boron, and oxygen, and, thus, represents an aluminum-free zeolitic material. The term "aluminum-free zeolitic material" as used in the context of the present invention relates to a B-Zeolite which contains at most 100 weight-ppm, preferably at most 50 weight-ppm of aluminum, calculated as element and based on the weight of the B-Zeolite, preferably B-MWW, B-BEA, B-MFI, B-CHA, B-MOR, B-MTW, B-RUB, B-LEV, B-FER, B-MEL, or B-RTH, more preferably B-MWW. The term "essentially consists of silicon, boron, and oxygen" as used in this context of the present invention relates to B-Zeolite materials, preferably B-MWW, B-BEA, B-MFI, B-CHA, B-MOR, B-MTW, B-RUB, B-LEV, B-FER, B-MEL, or B-RTH materials, more preferably B-MWW materials which may contain, in addition to silicon, boron, and oxygen, certain impurities resulting from the respective preparation process, such as alkali metals, alkaline earth metals, or organic carbon. These impurities are contained in the B-Zeolite, preferably the B-MWW, B-BEA, B-MFI, B-CHA, B-MOR, B-MTW, B-RUB, B-LEV, B-FER, B-MEL, or B-RTH, more preferably the B-MWW in amounts of preferably up to 1 weight-% in total, more preferably up to 0.5 weight-% in total, more preferably up to 0.2 weight-% in total, more preferably up to 0.1 weight-% in total, in each case based on the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i).

According to the present invention, the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i) has a B content preferably in the range of from 0.5 to 5.0 weight-%, more preferably from 0.75 to 4.0 weight-%, more preferably from 1.0 to 3.0 weight-%, calculated as element and based on the total weight of the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i). Especially preferred boron contents are in the range of from 1.4 to 2.4 weight-%, more preferably from 1.6 to 2.4 weight-%, more preferably from 1.8 to 2.0 weight-%. Further, the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i) has a Si content preferably in the range of from 38 to 44 weight-%, more preferably from 39 to 43 weight-%, more preferably from 40 to 42 weight-%, calculated as elemental Si and based on the total weight of the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i). Further, the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i) has a C content (total organic carbon, TOC) preferably in the range of from 0.14 to 0.25 weight-%, more preferably from 0.15 to 0.22 weight-%, more preferably from 0.16 to 0.20 weight-%, calculated as elemental C and based on the total weight of the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i).

Therefore, the present invention relates to a process for the preparation of a zeolitic material, and the zeolitic material obtainable and/or obtained by this process, as defined above, wherein the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW provided in (i) essentially consists of B, Si, and O, and has a B content in the range of from 0.5 to 5.0 weight-% calculated as elemental B, a Si content in the range of from 38 to 44 weight-%, calculated as elemental Si, and a TOC content in the range of from 0.14 to 0.25 weight-%, in each case based on the total weight of the B-Zeolite, preferably the B-MWW, B-BEA, B-MFI, B-CHA, B-MOR, B-MTW, B-RUB, B-LEV, B-FER, B-MEL, or B-RTH, more preferably the B-MWW provided in (i).

No specific restrictions exist as far as the methods for providing the B-Zeolite, preferably the B-MWW, B-BEA, B-MFI, B-CHA, B-MOR, B-MTW, B-RUB, B-LEV, B-FER, B-MEL, or B-RTH, more preferably the B-MWW is concerned. Among others, conceivable methods are described in P. Wu et al., Hydrothermal Synthesis of a novel Titanosilicate with MWW Topology, Chemistry Letters (2000), pp. 774-775 or in examples 1 to 5 of WO 02/28774 A2.

According to a preferred process of the present invention, the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW is provided in (i) by a process comprising hydrothermally synthesizing the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW from a synthesis mixture containing at least one suitable silicon source, at least one suitable boron source, and at least one suitable template compound suitable for the preparation of a boron-containing zeolite, preferably either a boron-containing zeolitic material of structure type MWW (B-MWW) or a boron-containing zeolitic material which is not a boron-containing zeolitic material of structure type MWW (B-MWW), more preferably of structure type MWW, BEA, MFI, CHA, MOR, MTW, RUB, LEV, FER, MEL, or RTH, more preferably of structure tyope MWW, to obtain the B-MWW in its mother liquor, with a subsequent separation of the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW from its mother liquor. Suitable boron sources include, for example, boric acid, borate salts, boron halides, $B_2O_3$, with boric acid being especially preferred. Suitable silicon sources include, for example, fumed silica or colloidal silica such as ammonia-stabilized colloidal silica, with ammonia-stabilized colloidal silica being especially preferred. Suitable template compounds (structure directing agents) for the preparation of B-MWW include cyclic amines, for example, piperidine or hexamethylene imine, or N,N,N-trimethyl-1-adamantylammonium hydroxide, with piperidine, hexamethylene imine and a mixture thereof being especially preferred.

In particular as far as the B-MWW is concerned, during hydrothermal synthesis, a B-MWW precursor is prepared from which, after calcination, the B-MWW is obtained.

Therefore, the present invention relates to a process for the preparation of a zeolitic material, and the zeolitic material obtainable and/or obtained by this process, as defined above, wherein
(a) hydrothermally synthesizing the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH, from a synthesis mixture containing at least one silicon source, at least one boron source, and at least one template compound, to obtain the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW, B-BEA, B-MFI, B-CHA, B-MOR, B-MTW, B-RUB, B-LEV, B-FER, B-MEL, or B-RTH in its mother liquor;
(b) separating the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH from its mother liquor;
(c) optionally drying the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW, B-BEA, B-MFI, B-CHA, B-MOR, B-MTW, B-RUB, B-LEV, B-FER, B-MEL, or B-RTH separated according to (b);
(d) calcining the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH obtained from (b) or (c), preferably at a temperature in the range of from 500 to 700° C.

Therefore, the present invention preferably relates to a process for the preparation of a zeolitic material, and the zeolitic material obtainable and/or obtained by this process, as defined above, wherein
(a) hydrothermally synthesizing the B-MWW precursor from a synthesis mixture containing at least one silicon source, preferably ammonia stabilized colloidal silica, at least one boron source, preferably boric acid, and at least one template compound, preferably selected from the group consisting of piperidine, hexamethylene imine, and a mixture thereof, to obtain the B-MWW in its mother liquor;
(b) separating the B-MWW precursor from its mother liquor;
(c) optionally drying the B-MWW precursor separated according to (b);
(d) calcining the B-MWW obtained from (b) or (c), preferably at a temperature in the range of from 500 to 700° C. obtaining the B-MWW.

According to (a), a suitable starting mixture, preferably an aqueous mixture, containing the B-Zeolite precursors, preferably the precursors of either the boron-containing zeolitic material of structure type MWW (B-MWW) precursor or of the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH precursors, more preferably the B-MWW precursor precursors, preferably the B containing precursor, the Si containing precursor, and at least one suitable template compound (structure directing agent), is subjected to hydrothermal crystallization under autogenous pressure. For crystallization purposes, it may be conceivable to use at least one suitable seeding material. Preferably, the crystallization time is in the range of from 3 to 8 days, more preferably from 4 to 6 days. During hydrothermal synthesis, the crystallization mixture may be stirred. The temperatures applied during crystallization are preferably in the range of from 160 to 200° C. more preferably from 160 to 180° C. The amounts of precursor compounds are suitably chosen so that above-described B-Zeolite, preferably the B-MWW precursor, B-BEA, B-MFI, B-CHA, B-MOR, B-MTW, B-RUB, B-LEV, B-FER, B-MEL, or B-RTH, more preferably the B-MWW precursor can be obtained having the described preferred compositions.

After hydrothermal synthesis, the obtained B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH, more preferably the B-MWW precursor is suitably separated from its mother liquor. All methods of separating the B-Zeolite, preferably the B-MWW precursor, B-BEA, B-MFI, B-CHA, B-MOR, B-MTW, B-RUB, B-LEV, B-FER, B-MEL, or B-RTH, more preferably the B-MWW precursor from its mother liquor are conceivable. These methods include, for example, filtration, ultrafiltration, diafiltration and centrifugation methods or, for instance, spray drying processes and spray granulation processes. A combination of two or more of these methods can be applied. According to the present invention, the B-Zeolite, preferably the B-MWW precursor, B-BEA, B-MFI, B-CHA, B-MOR, B-MTW, B-RUB, B-LEV, B-FER, B-MEL, or B-RTH, more preferably the B-MWW precursor is preferably separated from its mother liquid by filtration to obtain a filter cake which is preferably subjected to washing, preferably with water. Subsequently, the filter cake, optionally further processed to obtained a suitable suspension, is subjected to spray drying or to ultrafiltration. Prior to separating the B-Zeolite, preferably the B-MWW precursor, B-BEA, B-MFI, B-CHA, B-MOR, B-MTW, B-RUB, B-LEV, B-FER, B-MEL, or B-RTH, more preferably the B-MWW precursor from its mother liquor, it is possible to increase the B-Zeolite, preferably the B-MWW precursor, B-BEA, B-MFI, B-CHA, B-MOR, B-MTW, B-RUB, B-LEV, B-FER, B-MEL, or B-RTH, more preferably the B-MWW precursor content of the mother liquor by concentrating the suspension. If washing as applied, it is preferred to continue the washing process until the washing water has a conductivity of less than 1,000 microSiemens/cm, more preferably of less than 900 microSiemens/cm, more preferably of less than 800 microSiemens/cm, more preferably of less than 700 microSiemens/cm.

After separation of the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH, more preferably the B-MWW precursor from the suspension, preferably achieved via filtration, and after washing, the washed filter cake containing the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH, more preferably the B-MWW precursor is optionally subjected to pre-drying, for example by subjecting the filter cake to a suitable gas stream, preferably a nitrogen stream, for a time preferably in the range of from 4 to 10 h, more preferably from 5 to 8 h.

Subsequently, the pre-dried filter cake is optionally dried at temperatures in the range of from 100 to 300° C. more preferably from 150 to 275° C. more preferably from 200 to 250° C. in a suitable atmosphere such as technical nitrogen, air, or lean air, preferably in air or lean air. Such drying can be accomplished, for example, by spray-drying. Further, it is possible to separate the B-Zeolite, preferably either the boron-containing zeolitic material of structure type MWW (B-MWW) precursor or the boron-containing zeolitic material which is not a boron-containing zeolitic material of structure type MWW (B-MWW precursor), more preferably the B-MWW precursor, B-BEA, B-MFI, B-CHA, B-MOR, B-MTW, B-RUB, B-LEV, B-FER, B-MEL, or B-RTH, more preferably the B-MWW precursor from its mother liquor via a suitable filtration method, followed by washing and spray-drying.

Therefore, the present invention also relates to above-defined process, wherein the B-Zeolite, preferably either the boron-containing zeolitic material of structure type MWW (B-MWW) precursor or the boron-containing zeolitic material which is not a boron-containing zeolitic material of structure type MWW (B-MWW) precursor, more preferably the B-MWW precursor, B-BEA, B-MFI, B-CHA, B-MOR, B-MTW, B-RUB, B-LEV, B-FER, B-MEL, or B-RTH, more preferably the B-MWW precursor provided in (i) is provided in the form of a spray-powder or a spray-granulate.

After drying, the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW is subjected to calcination at temperatures in the range of from 500 to 700° C. more preferably from 550 to 675° C. more preferably from 600 to 675° C. in a suitable atmosphere such as technical nitrogen, air, or lean air, preferably in air or lean air.

According to an especially preferred embodiment of the present invention, the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW is separated from its mother liquor by filtration, subjected to spray-drying, with the obtained spray powder being calcined.

Preferably, if in stage (I) B-MWW is prepared, the B-MWW is prepared by a process whose preferred steps and conditions are defined by the following embodiments 1 to 28 and the respective dependencies as indicated:

1. A process for preparing an aluminum-free boron containing zeolitic material comprising the framework structure MWW (B-MWW), comprising
   (a) hydrothermally synthesizing a B-MWW precursor from a synthesis mixture containing water, a silicon source, a boron source, and an MWW template compound obtaining the B-MWW precursor in its mother liquor, the mother liquor having a pH above 9;
   (b) adjusting the pH of the mother liquor, obtained in (a) and containing the B-MWW precursor, to a value in the range of from 6 to 9;
   (c) separating the B-MWW precursor from the pH-adjusted mother liquor obtained in (b) by filtration in a filtration device.

2. The process of embodiment 1, wherein in (a), at least 95 weight-%, preferably at least 99 weight-%, more preferably at least 99.9 weight-% of the synthesis mixture consist of the water, the silicon source, the boron source, and the template compound.

3. The process of embodiment 1 or 2, wherein in (a), the silicon source is selected from the group consisting of fumed silica, colloidal silica, and a mixture thereof, the silicon source preferably being colloidal silica, more preferably ammonia-stabilized silica, the boron source is selected from the group consisting of boric acid, borates, boron oxide, and a mixture of two or more thereof, the boron source preferably being boric acid, and the MWW template compound selected from the group consisting of piperidine, hexamethylene imine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof, the MWW template compound preferably being piperidine.

4. The process of any of embodiments 1 to 3, wherein in (a), the synthesis mixture contains the boron source, calculated as elemental boron, relative to the silicon source, calculated as elemental silicon, in a molar ratio in the range of from 0.4:1 to 2.0:1, preferably from 0.6:1 to 1.9:1, more preferably from 0.9:1 to 1.4:1, the water relative to the silicon source, calculated as elemental silicon, in a molar ratio in the range of from 1:1 to 30:1, preferably from 3:1 to 25:1, more preferably from 6:1 to 20:1; and the template compound relative to the silicon source, calculated as elemental silicon, in a molar ratio in the range of from 0.4:1 to 2.0:1, preferably from 0.6:1 to 1.9:1, more preferably from 0.9:1 to 1.4:1.
5. The process of any of embodiments 1 to 4, wherein in (a), the hydrothermal synthesizing is carried out at a temperature in the range of from 160 to less than 180° C. preferably from 170 to 175° C. for a period of time in the range of from 1 to 72 h, preferably from 6 to 60 h, more preferably from 12 to 50 h.
6. The process of any of embodiments 1 to 5, wherein in (a), the hydrothermal synthesizing is carried out at least partially under stirring.
7. The process of any of embodiments 1 to 6, wherein in (a), the synthesis mixture additionally contains a seeding material, preferably a zeolitic material comprising the framework structure MWW, more preferably a boron containing zeolitic material comprising the framework structure MWW.
8. The process of embodiment 7, wherein the synthesis mixture contains the seeding material, relative to the silicon source, in a weight ratio in the range of from 0.01:1 to 1:1, preferably from 0.02:1 to 0.5:1, more preferably from 0.03:1 to 0.1:1, calculated as amount of seeding material in kg relative to silicon contained in the silicon source calculated as silicon dioxide in kg.
9. The process of any of embodiments 1 to 8, wherein the pH of the mother liquor obtained from (a) is above 10, preferably in the range of from 10.5 to 12, more preferably from 11 to 11.5.
10. The process of any of embodiments 1 to 9, wherein in (b), the pH of the mother liquor obtained in (a) is adjusted to a value in the range of from 6.5 to 8.5, preferably from 7 to 8.
11. The process of any of embodiments 1 to 10, wherein in (b), the pH is adjusted by a method comprising
    (i) adding an acid to the mother liquor obtained from (a) containing the B-MWW precursor, wherein the adding is preferably carried out at least partially under stirring.
12. The process of embodiment 11, wherein in (i), the adding is carried out at a temperature in the range of from 20 to 70° C. preferably from 30 to 65° C. more preferably from 40 to 60° C.
13. The process of embodiment 11 or 12, wherein in (i), the acid is an inorganic acid, preferably an aqueous solution containing the inorganic acid.
14. The process of embodiment 13, wherein the inorganic acid is selected from the group consisting of phosphoric acid, sulphuric acid, hydrochloric acid, nitric acid, and a mixture of two or more thereof, the inorganic acid preferably being nitric acid.
15. The process of any of embodiments 11 to 14, the method additionally comprising
    (ii) stirring the mother liquor to which the acid was added according to (i), wherein during (ii), no acid is added to the mother liquor.
16. The process of embodiment 15, wherein in (ii), the stirring is carried out at a temperature in the range of from 20 to 70° C. preferably from 25 to 65° C. more preferably from 30 to 60° C.
17. The process of any of embodiments 1 to 16, wherein in (b), the size of the particles contained in the mother liquor, expressed by the respective Dv10, Dv50, and Dv90 value, is increased for at least 2%, preferably at least 3%, more preferably at least 4.5% regarding Dv10, for at least 3%, preferably at least 3%, more preferably at least 4.5% regarding Dv50, and for at least 5%, preferably at least 6%, more preferably at least 7% regarding Dv90.
18. The process of any of embodiments 1 to 17, wherein the pH-adjusted mother liquor obtained from (b) has a solids content in the range of from 1 to 10 weight-%, preferably from 4 to 9 weight-%, more preferably from 7 to 8 weight-%, based on the total weight of the pH-adjusted mother liquor obtained from (b).
19. The process of any of embodiments 1 to 18, wherein the pH-adjusted mother liquor obtained from (b) has a filtration resistance in the range of from 10 to 50 mPa*s/m$^2$, preferably from 15 to 45 mPa*s/m$^2$, more preferably from 20 to 40 mPa*s/m$^2$.
20. The process of any of embodiments 1 to 19, further comprising
    (d) washing the B-MWW precursor obtained from (c), preferably the filter cake obtained from (c), wherein the washing is preferably performed using water was washing agent.
21. The process of embodiment 20, wherein in (d), the filter cake obtained from (c) is has a washing resistance in the range of from 10 to 50 mPa*s/m$^2$, preferably from 15 to 45 mPa*s/m$^2$, more preferably from 20 to 40 mPa*s/m$^2$.
22. The process of embodiment 20 or 21, wherein the washing is carried out until the conductivity of the filtrate is at most 300 microSiemens/cm, preferably at most 250 microSiemens/cm, more preferably at most 200 microSiemens/cm.
23. The process of any of embodiments 1 to 22, further comprising
    (e) drying the B-MWW precursor obtained from (c), preferably from (d), at a temperature in the range of from 20 to 50° C. preferably from 20 to 40° C. more preferably from 20 to 30° C. wherein the drying is preferably carried out by subjecting the B-MWW to a gas stream, preferably a nitrogen stream.
24. The process of any of embodiments 1 to 23, wherein the residual moisture of the B-MWW precursor obtained from (c), preferably from (d), more preferably from (e), is in the range of from 80 to 90 weight-%, preferably from 80 to 85 weight-%.
25. The process of any of embodiments 1 to 24, further comprising
    (f) preparing a suspension, preferably an aqueous suspension, containing the B-MWW precursor obtained from to (c), preferably from (d), more preferably from (e), and having a solids content in the range of from 10 to 20 weight-%, preferably from 12 to 18 weight-%, more preferably from 14 to 16 weight-%;
    (g) spray drying the suspension obtained from (f) containing the B-MWW precursor, obtaining a spray powder;
    (h) calcining the spray powder obtained from (g) containing the B-MWW precursor, preferably at a temperature in the range of from 500 to 700° C. more preferably from 550 to 650° C. more preferably from 575 to 625° C. for a period of time in the range of from 1 to 24 h, preferably from 2 to 18 h, more preferably from 6 to 12 h, obtaining a spray powder of which at least 99 weight-%, more preferably at least 99.5 weight-% consist of the B-MWW.
26. The process of embodiment 25, wherein in (h), the calcining is carried out in continuous mode, preferably in a rotary calciner, preferably at a throughput in the range of from 0.5 to 20 kg spray powder per h.
27. The process of embodiment 25 or 26, wherein the degree of crystallinity of the B-MWW contained in the spray powder obtained from (h) is at least (75±5)%, preferably at least (80±5)%, as determined via XRD.

28. The process of any of embodiments 25 to 27, wherein the BET specific surface area of the B-MWW contained in the spray powder obtained from (h) is at least 300 m²/g, preferably in the range of from 300 to 500 m²/g, as determined according to DIN 66131.

According to the present invention, the B-MWW obtained has a B content preferably in the range of from 1.2 to 2.4 weight-% or from 1.4 to 2.4 weight-%, calculated as elemental B. Further, the B-MWW obtained has a Si content preferably in the range of from 38 to 45 weight-% or from 38 to 44 weight-%, calculated as elemental Si. Further, the B-MWW obtained has a C content (total organic carbon, TOC) preferably in the range of from 0.14 to 0.25 weight-%, more preferably from 0.15 to 0.22 weight-%, more preferably from 0.16 to 0.20 weight-%, calculated as elemental C. More preferably, the B-MWW obtained has a C content (total organic carbon, TOC) of less than 0.3 weight-%, more preferably less than 0.2 weight-%, more preferably less than 0.1 weight-%.

Step (ii)

The B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW provided in (i), especially preferably the separated, spray-dried and calcined B-Zeolite, preferably the B-MWW, B-BEA, B-MFI, B-CHA, B-MOR, B-MTW, B-RUB, B-LEV, B-FER, B-MEL, or B-RTH, more preferably the B-MWW, is deboronated in (ii) with a liquid solvent system. Contrary to the prior art teaching, neither steam nor the acids described as mandatory deboronating agents are employed. Surprisingly, it was found that for deboronating the provided B-Zeolite, preferably the B-MWW, B-BEA, B-MFI, B-CHA, B-MOR, B-MTW, B-RUB, B-LEV, B-FER, B-MEL, or B-RTH, more preferably the B-MWW, neither steam nor said acids are required. Even more surprisingly, it was found that deboronating the B-Zeolite, preferably the B-MWW, B-BEA, B-MFI, B-CHA, B-MOR, B-MTW, B-RUB, B-LEV, B-FER, B-MEL, or B-RTH, more preferably the B-MWW does not require an acid at all. Therefore, the present invention relates to above-defined process and zeolitic material obtainable or obtained therefrom, wherein the liquid solvent system does not contain an inorganic or organic acid, or a salt thereof.

The term "deboronating a B-Zeolite", especially the term "deboronating a B-MWW" as used in the context of the present invention relates to a process according to which at least a portion of the boron atoms contained in the zeolitic framework is removed by the inventive treatment. Preferably, the term "deboronating a B-Zeolite", especially the term "deboronating a B-MWW" as used in the context of the present invention relates to a process wherein the obtained Zeolite, preferably the obtained MWW, BEA, MFI, CHA, MOR, MTW, RUB, LEV, FER, MEL, RTH, more preferably the obtained MWW contains at most 0.2, more preferably at most 0.1 weight-% of boron, calculated as element and based on the total weight of the Zeolite, preferably the MWW, BEA, MFI, CHA, MOR, MTW, RUB, LEV, FER, MEL, RTH, more preferably the MWW.

The liquid solvent system used in (ii) is selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably from 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Most preferably, the liquid solvent system consists of water. Therefore, the present invention relates to above-defined process and zeolitic material obtainable or obtained therefrom, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water.

As far as the amount of B-Zeolite, preferably of either the boron-containing zeolitic material of structure type MWW (B-MWW) or of the boron-containing zeolitic material which is not a boron-containing zeolitic material of structure type MWW (B-MWW), more preferably of B-MWW, B-BEA, B-MFI, B-CHA, B-MOR, B-MTW, B-RUB, B-LEV, B-FER, B-MEL, or B-RTH, more preferably of B-MWW which is employed relative to the amount of liquid solvent system, no specific restrictions exist. Surprisingly, it was found that it is not necessary to use a large excess of liquid solvent system, which finding renders the inventive process very advantageous. Preferably, the weight ratio of B-Zeolite, preferably of B-MWW, B-BEA, B-MFI, B-CHA, B-MOR, B-MTW, B-RUB, B-LEV, B-FER, B-MEL, or B-RTH, more preferably of B-MWW relative to the liquid solvent system is in the range of from 1:5 to 1:40, more preferably from 1:10 to 1:30, more preferably from 1:10 to 1:20 such as from 1:10 to 1:15, from 1:11 to 1:16, from 1:12 to 1:17, from 1:13 to 1:18, from 1:14 to 1:19, from 1:15 to 1:20.

The reaction conditions according to (ii) are not specifically restricted provided that the solvent system described above is in its liquid state. In particular, concerning the preferred temperatures described below, the skilled person will choose the respective pressure under which the deboronation is carried out in order to keep the solvent system in its liquid state.

Preferably, the treating according to (ii) is carried out at a temperature in the range of from 50 to 125° C. more preferably from 70 to 120° C. more preferably from 90 to 115° C. more preferably from 90 to 110° C. more preferably from 90 to 105° C. more preferably from 95 to 105° C. more preferably from 95 to 100° C. Most preferably, the deboronation according to (ii) is carried out at the boiling point of the solvent system. If the solvent system is comprised of 2 or more components, the deboronation according to (ii) is preferably carried out at the boiling point of the component having the lowest boiling point. According to a further preferred embodiment of the present invention, the deboronation according to (ii) is carried out under reflux. Thus, the preferred vessel used for the deboronation according to (ii) is equipped with a reflux condenser. During (ii), the temperature of the liquid solvent system is kept essentially constant or changed, the deboronation thus being carried out at two or more different temperatures. Most preferably, the temperature is kept essentially constant.

Surprisingly, it was found that it is not necessary to pre-treat the boron containing zeolitic material with a liquid system at elevated temperatures prior to the deboronation step in order to remove a portion of the boron during these steps. Also this finding renders the inventive process very advantageous, for example from an economically point of view, since according to the present invention, only one deboronation step (ii) is necessary to achieve the desired boron removal. Therefore, according to the present invention, step (ii) is preferably carried out exactly once. According to a preferred embodiment of the present invention, the zeolitic material provided in (i), after its synthesis, is not subjected to a treatment with a liquid system, such as a treatment with a washing agent or the like, at a temperature of 50° C. or more prior to the deboronating according to (ii).

During deboronation according to (ii), it is further preferred to suitably stir the liquid solvent system. During (ii), the stirring rate is kept essentially constant or changed, the deboronation thus being carried out at two or more different stirring rates. Most preferably, the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW is suspended in the liquid solvent system at a first stirring rate, and during deboronation at above-described temperatures, the stirring rate is changed, preferably increased. The stirring rates as such can be suitably chosen depending, for example, on the volume of the liquid solvent system, the amount of B-Zeolite, preferably the B-MWW, B-BEA, B-MFI, B-CHA, B-MOR, B-MTW, B-RUB, B-LEV, B-FER, B-MEL, or B-RTH, more preferably the B-MWW employed, the desired temperature, and the like. Preferably, the stirring rate under which the B-Zeolite, preferably the B-MWW, B-BEA, B-MFI, B-CHA, B-MOR, B-MTW, B-RUB, B-LEV, B-FER, B-MEL, or B-RTH, more preferably the B-MWW is suspended in the liquid solvent system is in the range of from 0 to 200 r.p.m. (rounds per minute), more preferably from 10 to 200 r.p.m., more preferably from 20 to 55 r.p.m., more preferably from 30 to 50 r.p.m. The stirring rate under which the deboronation at the above-described temperatures is carried out is preferably in the range of from 50 to 100 r.p.m., more preferably from 55 to 90 r.p.m., more preferably from 60 to 80 r.p.m.

Preferably, the B-Zeolite, preferably either the boron-containing zeolitic material of structure type MWW (B-MWW) or the boron-containing zeolitic material which is not a boron-containing zeolitic material of structure type MWW (B-MWW), more preferably the B-MWW, B-BEA, B-MFI, B-CHA, B-MOR, B-MTW, B-RUB, B-LEV, B-FER, B-MEL, or B-RTH, more preferably the B-MWW is suspended in the liquid solvent system at ambient temperature and pressure, wherein the temperature of the liquid solvent system is then increased up to the desired deboronation temperature. Preferably, the temperature is increased with a rate of from 5 to 10° C. per hour, more preferably from 6 to 9° C. per hour.

Concerning the duration of the deboronation of (ii), no specific restrictions exist. Surprisingly, it was found that it is not necessary to carry out the treatment according to step (ii) for too long a period of time, which finding renders the inventive process very advantageous, for example from an economically point of view and in particular for an industrial-scale process. Preferably, the treating according to (ii) is carried out for a time in the range of from 6 to 20 h, more preferably from 7 to 17 h, more preferably from 8 to 15 h, more preferably from 9 to 12 h. This time is to be understood as the time where the liquid solvent system is maintained under the above-described deboronation temperature.

Step (iii)

According to a preferred embodiment of the present invention, the deboronated Zeolite, preferably either the boron-containing zeolitic material of structure type MWW (B-MWW) or the boron-containing zeolitic material which is not a boron-containing zeolitic material of structure type MWW (B-MWW), more preferably the MWW, BEA, MFI, CHA, MOR, MTW, RUB, LEV, FER, MEL, or RTH, more preferably the MWW obtained from (ii) is subjected to a post-treatment comprising the separation, a preferred drying and an optional calcination of the Zeolite, preferably the MWW, BEA, MFI, CHA, MOR, MTW, RUB, LEV, FER, MEL, or RTH, more preferably the MWW.

Therefore, the present invention relates to above-defined process and zeolitic material obtainable or obtained therefrom, said process further comprising (iii) post-treating the Zeolite, preferably the MWW or the Zeolite which is not MWW, more preferably the MWW, BEA, MFI, CHA, MOR, MTW, RUB, LEV, FER, MEL, or RTH, more preferably the MWW, obtained from (ii) by a process comprising
(iii.1) separating the Zeolite, preferably the MWW or the Zeolite which is not MWW, more preferably the MWW, BEA, MFI, CHA, MOR, MTW, RUB, LEV, FER, MEL, or RTH, more preferably the MWW from the liquid solvent system;
(iii.2) preferably drying the separated Zeolite, preferably the separated MWW or the separated Zeolite which is not MWW, more preferably the separated the MWW, BEA, MFI, CHA, MOR, MTW, RUB, LEV, FER, MEL, or RTH, more preferably the separated MWW, preferably by spray-drying;
(iii.3) optionally calcining the Zeolite, preferably the MWW or the Zeolite which is not MWW, more preferably the MWW, BEA, MFI, CHA, MOR, MTW, RUB, LEV, FER, MEL, or RTH, more preferably the MWW, obtained from (iii.1) or (iii.2), preferably at temperatures in the range of from 500 to 700° C.

Therefore, the present invention preferably relates to above-defined process and zeolitic material obtainable or obtained therefrom, said process further comprising
(iii) post-treating the MWW obtained from (ii) by a process comprising
(iii.1) separating the MWW from the liquid solvent system;
(iii.2) preferably drying the separated MWW, preferably by spray-drying;
(iii.3) optionally calcining the MWW obtained from (iii.1) or (iii.2), preferably at temperatures in the range of from 500 to 700° C.

According to (iii.1), the Zeolite, preferably either the boron-containing zeolitic material of structure type MWW (B-MWW) or the boron-containing zeolitic material which is not a boron-containing zeolitic material of structure type MWW (B-MWW), more preferably the MWW, BEA, MFI, CHA, MOR, MTW, RUB, LEV, FER, MEL, or RTH, more preferably the MWW is suitably separated from the suspension obtained (ii), which suspension is preferably cooled prior to (iii). All methods of separating the Zeolite, preferably the MWW, BEA, MFI, CHA, MOR, MTW, RUB, LEV, FER, MEL, or RTH, more preferably the MWW from the suspension are conceivable. These methods include, for example, filtration, ultrafiltration, diafiltration and centrifugation methods or, for instance, spray drying processes and spray granulation processes. A combination of two or more of these methods can be applied. According to the present invention, the Zeolite, preferably the MWW, BEA, MFI, CHA, MOR, MTW, RUB, LEV, FER, MEL, or RTH, more preferably the MWW is preferably separated from the suspension by filtration to obtain a filter cake which is preferably subjected to washing, preferably with water. Subsequently, the filter cake, optionally further processed to obtained a suitable suspension, is subjected to spray drying or to ultrafiltration, preferably spray-drying. Prior to separation of the Zeolite, preferably the MWW, BEA, MFI, CHA, MOR, MTW, RUB, LEV, FER, MEL, or RTH, more preferably the MWW from the suspension, it is possible to increase the Zeolite content, preferably the MWW, BEA, MFI, CHA, MOR, MTW, RUB, LEV, FER, MEL, or RTH content, more preferably the MWW content of the suspension by concentrating the suspension. If washing as applied, it may be preferred to continue the washing process until the washing water has a conductivity of less than 1,000 microSiemens/cm, more preferably of less than 900 microSiemens/cm, more preferably of less than 800 microSiemens/cm, more preferably of less than 700 microSiemens/cm.

After separation of the Zeolite from the suspension, preferably achieved via filtration, and after washing, the washed filter cake containing the Zeolite, preferably the MWW or the Zeolite which is not MWW, more preferably the MWW, BEA, MFI, CHA, MOR, MTW, RUB, LEV, FER, MEL, or RTH, more preferably the MWW is preferably subjected to pre-drying, for example by subjecting the filter cake to a suitable gas stream, preferably a nitrogen stream, for a time preferably in the range of from 4 to 10 h, more preferably from 5 to 8 h.

Subsequently, the pre-dried filter cake is preferably dried at temperatures in the range of from 100 to 300° C. more preferably from 150 to 275° C. more preferably from 200 to 250° C. in a suitable atmosphere such as technical nitrogen, air, or lean air, preferably in air or lean air. Such drying can be accomplished, for example, by spray-drying. Further, it is possible to separate the Zeolite, preferably the MWW or the Zeolite which is not MWW, more preferably the MWW, BEA, MFI, CHA, MOR, MTW, RUB, LEV, FER, MEL, or RTH, more preferably the MWW from the suspension via a suitable filtration method, followed by washing and spray-drying.

After drying, the Zeolite, preferably the MWW or the Zeolite which is not MWW, more preferably the MWW, BEA, MFI, CHA, MOR, MTW, RUB, LEV, FER, MEL, or RTH, more preferably the MWW is optionally subjected to calcination at temperatures in the range of from 400 to 700° C. more preferably from 550 to 675° C. more preferably from 600 to 675° C. in a suitable atmosphere such as technical nitrogen, air, or lean air, preferably in air or lean air. Preferably, no calcination is carried out according to (iii), in particular in case a step (iv) is carried out as described hereinunder.

According to the present invention, the Zeolite, preferably the MWW or the Zeolite which is not MWW, more preferably the MWW, BEA, MFI, CHA, MOR, MTW, RUB, LEV, FER, MEL, or RTH, more preferably the MWW obtained from (iii), preferably after (iii.2), has a B content preferably of at most 0.1 weight-%, more preferably at most 0.09 weight-%, more preferably at most 0.08 weight-%, calculated as elemental B. Further, the Zeolite, preferably the MWW or the Zeolite which is not MWW, more preferably the MWW, BEA, MFI, CHA, MOR, MTW, RUB, LEV, FER, MEL, or RTH, more preferably the MWW obtained has a Si content preferably in the range of from 39 to 45 weight-%, more preferably from 40 to 44 weight-%, more preferably from 41 to 43 weight-%, calculated as elemental Si. Further, the Zeolite, preferably the MWW or the Zeolite which is not MWW, more preferably the MWW, BEA, MFI, CHA, MOR, MTW, RUB, LEV, FER, MEL, or RTH, more preferably the MWW obtained has a C content (total organic carbon, TOC) preferably in the range of from 0.15 to 0.30 weight-%, more preferably from 0.18 to 0.27 weight-%, more preferably from 0.20 to 0.25 weight-%, calculated as elemental C.

The optionally post-treated deboronated zeolitic material can be subjected, for example, to a subsequent step according to which a molding is prepared based on the zeolitic material, for example by suitably mixing the zeolitic material with at least one binder and/or with at least one binder precursor, and optionally at least one pore-forming agent and/or at least one plasticizing agent.

Step (iv)

According to a preferred embodiment of the present invention relating to the deboronated MWW, the preferably post-treated deboronated MWW obtained from (ii) or (iii), preferably (iii), more preferably (iii.2), is further subjected to incorporation of at least one heteroatom $Het^1$ to obtain a zeolitic material having structure type MWW and containing, preferably in addition to Si and O and optionally any residual B, the at least one heteroatom Het'. Generally, there are no specific restrictions how such heteroatom is introduced into the MWW. According to a preferred process, the at least one heteroatom is introduced via hydrothermal synthesis, i.e. in aqueous solution under autogenous pressure at elevated temperatures.

According to a preferred process of the present invention, a suitable synthesis mixture, preferably an aqueous synthesis mixture is prepared in a step (iv.1), which synthesis mixture contains the MWW, at least one suitable template compound and at least one source of the at least one heteroatom ($Het^1$). Suitable template compounds (structure directing agents) include cyclic amines, for example, piperidine or hexamethylene imine, or N,N,N-trimethyl-1-adamantylammonium hydroxide, with piperidine, hexamethylene imine and a mixture thereof being especially preferred. Most preferred is piperidine. As far as the at least one heteroatom $Het^1$ is concerned, no specific restrictions exist. Preferred heteroatoms are selected from the group consisting of Ti, Al, Zr, V, Nb, Ta, Cr, Mo, W, Mn, Fe, Co, Ni, Zn, Ga, Ge, In, Pb, and a mixture of two or more thereof. Titanium is especially preferred as Het'.

Concerning preferred sources of titanium, titanium oxide, titanium halide and tetraalkylorthotitanates may be mentioned. However, the present invention is not limited thereto. Among these, titanium halides and tetraalkylorthotitanates are more preferred. More preferred are titanium tetrafluoride, tetraethylorthotitanate, tetrapropylorthotitanate, and tetrabutylorthotitanate, with tetrabutylorthotitanate being especially preferred.

Concerning preferred sources of aluminum, alumina, aluminum nitrate may be mentioned, with aluminum nitrate being especially preferred.

Concerning preferred sources of zirconium, zirconium oxide, zirconium halides and zirconium tetraalkoxides may be mentioned. Among these, zirconium halides and zirconium tetraalkoxides are more preferred. More preferred are zirconium tetrafluoride, zirconium tetraethoxide, and zirconium tetrabutoxide.

Concerning preferred sources of vanadium, vanadium oxide, vanadium halides and vanadium trialkoxide oxides may be mentioned. Among these, vanadium halides and vanadium trialkoxides are more preferred. More preferred are vanadium trichloride and vanadium oxytriisopropoxide.

Concerning preferred sources of niobium, niobium oxide, niobium halides and niobium tetraalkanoates may be mentioned. More preferred are niobium tetraalkanoates, with niobium tetrakis (2-ethylhexanoate) being especially preferred.

Concerning preferred sources of tantalum, tantalum oxide, tantalum halides and tantalum disulfide may be mentioned, with tantalum disulfide being especially preferred.

Concerning preferred sources of chromium, chromium acetate, chromium nitrate and chromium halides may be mentioned, with chromium nitrate being especially preferred.

Concerning preferred sources of molybdenum, molybdenum oxide, molybdenum halides and molybdenum sulfide may be mentioned, with molybdenum trichloride being especially preferred.

Concerning preferred sources of tungsten, tungsten oxide and tungsten halides may be mentioned, with tungsten tetrachloride being especially preferred.

Concerning preferred sources of manganese, manganese oxide, manganese halides, manganese acetate and manganese acetylacetonate may be mentioned, with manganese trisacetylacetonate being especially preferred.

Concerning preferred sources of iron, iron oxide, iron halides, iron acetate and iron nitrate may be mentioned, with iron nitrate being especially preferred.

Concerning preferred sources of cobalt, cobalt oxide, cobalt halides and cobalt trisacetylacetonate may be mentioned, with cobalt trisacetylacetonate being especially preferred.

Concerning preferred sources of nickel, nickel oxide, nickel halides, nickel nitrate and nickel acetate may be mentioned, with nickel nitrate and nickel acetate being especially preferred.

Concerning preferred sources of zinc, zinc oxide, zinc halides, zinc acetate and zinc nitrate may be mentioned, with zinc acetate and zinc nitrate being especially preferred.

Concerning preferred sources of gallium, gallium oxide, gallium halides and gallium nitrate may be mentioned, with gallium nitrate, gallium trichloride, and gallium trifluoride being especially preferred.

Concerning preferred sources of indium, indium oxide, indium halides and trialkoxy indium may be mentioned, with indium trichloride, indium trifluoride, and indium triisopropoxide being especially preferred.

Concerning preferred sources of lead, lead halides and tetraalkoxy lead may be mentioned, with lead acetate, lead chloride, lead nitrate, lead acetylacetonate, and lead being especially preferred.

In the synthesis mixture of (iv.1), the atomic ratio of the $Het^1$ relative to Si in the MWW is preferably in the range of from 0.001:1 to 0.3:1, such as from 0.005:1 to 0.2:1 or from 0.01:1 to 0.2:1.

The synthesis mixture obtained in (iv.1) is subjected to hydrothermal crystallization under autogenous pressure. It may be conceivable to use at least one suitable seeding material in step (iv.2) to obtain the zeolitic material of structure type MWW containing at least one heteroatom ($Het^1$MWW) contained in its mother liquor. Preferably, the crystallization time is in the range of from 4 to 8 days, more preferably from 4 to 6 days. During hydrothermal synthesis, the crystallization mixture may be stirred. The temperatures applied during crystallization are preferably in the range of from 160 to 200° C. more preferably from 160 to 180° C.

After hydrothermal synthesis, the obtained crystalline zeolitic material $Het^1$MWW is suitably separated from the mother liquor in step (iv.3). All methods of separating the $Het^1$MWW from its mother liquor are conceivable. These methods include, for example, filtration, ultrafiltration, diafiltration and centrifugation methods or, for instance, spray drying processes and spray granulation processes. A combination of two or more of these methods can be applied. According to the present invention, the $Het^1$MWW is preferably separated from its mother liquid by filtration to obtain a filter cake which is preferably subjected to washing, preferably with water.

Subsequently, the filter cake, optionally further processed to obtained a suitable suspension, is preferably subjected to spray drying or to ultrafiltration in step (iv.4). Prior to separating the $Het^1$MWW from its mother liquor, it is possible to increase the $Het^1$MWW content of the mother liquor by concentrating the suspension. If washing as applied, it is preferred to continue the washing process until the washing water has a conductivity of less than 1,000 microSiemens/cm, more preferably of less than 900 microSiemens/cm, more preferably of less than 800 microSiemens/cm, more preferably of less than 700 microSiemens/cm.

After separation of the $Het^1$MWW from its mother liquor, preferably achieved via filtration, and after washing, the washed filter cake containing the $Het^1$MWW is preferably subjected to pre-drying, for example by subjecting the filter cake to a suitable gas stream, preferably a nitrogen stream, for a time preferably in the range of from 4 to 10 h, more preferably from 5 to 8 h.

Subsequently, the pre-dried filter cake is preferably dried at temperatures in the range of from 100 to 300° C. more preferably from 150 to 275° C. more preferably from 200 to 250° C. in a suitable atmosphere such as technical nitrogen, air, or lean air, preferably in air or lean air. Such drying can be accomplished, for example, by spray-drying.

After drying, the $Het^1$MWW may be subjected to calcination in step (iv.5) at temperatures in the range of from 500 to 700° C. more preferably from 550 to 675° C. more preferably from 600 to 675° C. in a suitable atmosphere such as technical nitrogen, air, or lean air, preferably in air or lean air. Preferably, no calcination is carried out, in particular in case the $Het^1$MWW is subjected to step (v) as described hereinunder.

Therefore, the present invention relates to above-defined process and zeolitic material obtainable or obtained therefrom, said process further comprising (iv) incorporating at least one first heteroatom ($Het^1$) into the MWW thereby obtaining a zeolitic material of structure type MWW containing at least one heteroatom ($Het^1$MWW) by a process comprising (iv.1) preparing a synthesis mixture containing the MWW obtained according to (ii) or (iii), preferably (iii), a template compound, preferably selected from the group consisting of piperidine, hexamethylene imine, and a mixture thereof, and at least one source of at least one heteroatom ($Het^1$), wherein the heteroatom ($Het^1$) is preferably selected from the group consisting of Ti, Al, Zr, V, Nb, Ta, Cr, Mo, W, Mn, Fe, Co, Ni, Zn, Ga, Ge, In, Pb, and a mixture of two or more thereof, more preferably Ti;

(iv.2) hydrothermally synthesizing the $Het^1$MWW from the synthesis mixture obtained from (iv.1) thereby obtaining the $Het^1$MWW in its mother liquor;

(iv.3) separating the $Het^1$MWW from its mother liquor;

(iv.4) preferably drying the $Het^1$MWW separated according to (iv.3), preferably by spray-drying;

(iv.5) preferably calcining the $Het^1$MWW obtained from (iv.3) or (iv.4), preferably at temperatures in the range of from 500 to 700° C.

As mentioned above, Ti is preferably incorporated as $Het^1$ into the MWW. According to this embodiment, the TiMWW obtained from (iv) has a Ti content preferably in the range of from 2.0 to 3.0 weight-%, more preferably in the range of from 2.1 to 2.7 weight-%, more preferably from 2.2 to 2.6 weight-%, more preferably from 2.3 to 2.5 weight-%, calculated as elemental Ti. Further, the TiMWW obtained has a Si content preferably in the range of from 34 to 40 weight-%, more preferably from 35 to 39 weight-%, more preferably from 36 to 38 weight-%, calculated as elemental Si. Further, the TiMWW obtained has a C content (total organic carbon, TOC) preferably in the range of from 7.0 to 8.0 weight-%, more preferably from 7.2 to 7.8 weight-%, more preferably from 7.4 to 7.6 weight-%, calculated as elemental C.

Therefore, the present invention also relates to a process for the preparation of a zeolitic material of zeolitic structure MWW containing Ti (TiMWW) and the TiMWW obtainable or obtained according to this process, said process being defined as above and further comprising (iv) incorporating Ti into the MWW thereby obtaining a zeolitic material of structure type MWW containing Ti (TiMWW) by a process comprising
  (iv.1) preparing a synthesis mixture containing the MWW obtained according to (ii) or (iii), preferably (iii), a template compound, preferably selected from the group consisting of piperidine, hexamethylene imine, and a mixture thereof, and at least one source of Ti;
  (iv.2) hydrothermally synthesizing the TiMWW from the synthesis mixture obtained from (iv.1) thereby obtaining the TiMWW in its mother liquor;
  (iv.3) separating the TiMWW from its mother liquor;
  (iv.4) preferably drying the TiMWW separated according to (iv.3), preferably by spray-drying;
  (iv.5) optionally calcining the TiMWW obtained from (iv.3) or (iv.4), preferably at temperatures in the range of from 500 to 700° C.

Yet further, the present invention relates to a zeolitic material of zeolitic structure MWW containing Ti (TiMWW), having a Ti content in the range of from 2.1 to 2.7 weight-%, more preferably from 2.2 to 2.6 weight-%, more preferably from 2.3 to 2.5 weight-%, calculated as elemental Ti, a Si content in the range of from 34 to 40 weight-%, more preferably from 35 to 39 weight-%, more preferably from 36 to 38 weight-%, calculated as elemental Si, and a C content (total organic carbon, TOC) in the range of from 7.0 to 8.0 weight-%, more preferably from 7.2 to 7.8 weight-%, more preferably from 7.4 to 7.6 weight-%, calculated as elemental C.

The Het$^1$MWW obtained from (iv) can be subjected, for example, to a subsequent step according to which a molding is prepared based on the zeolitic material, for example by suitably mixing the zeolitic material with at least one binder and/or with at least one binder precursor, and optionally at least one pore-forming agent and/or at least one plasticizing agent.

Step (v)

According to a preferred embodiment of the present invention, the Het$^1$MWW obtained from (iv) is subjected to an acid treatment in a further step (v).

According to step (v), it is preferred to suspend the Het$^1$MWW in a step (v.1) in a liquid solvent system which preferably comprises water, more preferably consists of water, and which contains at least one acid. Suitable acids contained in the liquid solvent system are, for example, inorganic and/or organic acids such as hydrochloric acid, sulfuric acid, nitric acid, phosphoric acid, formic acid, acetic acid, propionic acid, oxalic acid, or tartaric acid. More preferably, the liquid solvent system contains at least one inorganic acid, more preferably nitric acid In a subsequent step (v.2), the suspension obtained from (v.2) is heated to a temperature preferably in the range of from 75 to 125° C. more preferably from 85 to 115° C. more preferably from 95 to 105° C. for a time in the range preferably of from 17 to 25 h, more preferably from 18 to 22 h.

After the acid treatment in step (v.2), the obtained Het$^1$MWW is preferably suitably separated from the suspension further comprising acid. All methods of separating the Het$^1$MWW from the suspension are conceivable. These methods include, for example, filtration, ultrafiltration, diafiltration and centrifugation methods or, for instance, spray drying processes and spray granulation processes. A combination of two or more of these methods can be applied. According to the present invention, the Het$^1$MWW is preferably separated from the suspension by filtration to obtain a filter cake which is preferably subjected to washing, preferably with water.

Subsequently, the filter cake, optionally further processed to obtained a suitable suspension, is subjected to spray drying or to ultrafiltration. Prior to separating the Het$^1$MWW from the suspension, it is possible to increase the Het$^1$MWW content of the suspension by concentrating the suspension. If washing as applied, it may be preferred to continue the washing process until the washing water has a conductivity of less than 1,000 microSiemens/cm, more preferably of less than 900 microSiemens/cm, more preferably of less than 800 microSiemens/cm, more preferably of less than 700 microSiemens/cm.

After separation of the Het$^1$MWW from the suspension, preferably achieved via filtration, and after washing, the washed filter cake containing the Het$^1$MWW is preferably subjected to pre-drying, for example by subjecting the filter cake to a suitable gas stream, preferably a nitrogen stream, for a time preferably in the range of from 4 to 10 h, more preferably from 5 to 8 h.

Subsequently, the pre-dried filter cake is preferably dried in a step (v.4) at temperatures in the range of from 100 to 300° C. more preferably from 150 to 275° C. more preferably from 200 to 250° C. in a suitable atmosphere such as technical nitrogen, air, or lean air, preferably in air or lean air. Such drying can be accomplished, for example, by spray-drying. Further, it is possible to separate the Het$^1$MWW from the suspension via a suitable filtration method, followed by washing and spray-drying.

After drying, the Het$^1$MWW is preferably subjected to calcination in a step (v.5) at temperatures in the range of from 500 to 700° C. more preferably from 550 to 675° C. more preferably from 600 to 675° C. in a suitable atmosphere such as technical nitrogen, air, or lean air, preferably in air or lean air.

Therefore, the present invention relates to above-defined process and zeolitic material obtainable or obtained therefrom, said process further comprising (v) acid-treating the Het$^1$MWW obtained from (iv) by a process comprising
  (v.1) suspending the Het$^1$MWW in a liquid solvent system, preferably water, said liquid solvent system containing at least one acid, preferably containing nitric acid;
  (v.2) heating the suspension obtained from (v.1) to a temperature in the range of from 75 to 125° C. for a time in the range of from 17 to 25 h;
  (v.3) separating the acid-treated Het$^1$MWW from the suspension;
  (v.4) preferably drying the Het$^1$MWW separated according to (v.3), preferably by spray-drying;
  (v.5) preferably calcining the Het$^1$MWW obtained from (v.3) or (v.4), preferably at temperatures in the range of from 500 to 700° C.

As mentioned above, Ti is preferably incorporated as Het$^1$ into the MWW. According to this embodiment, the TiMWW obtained from (v) preferably has a Ti content in the range of from 1.3 to 1.9 weight-%, more preferably from 1.4 to 1.8 weight-%, more preferably from 1.5 to 1.7 weight-%, calculated as elemental Ti, a Si content preferably in the range of from 39.5 to 45.5 weight-%, more preferably from 40.5 to 44.5 weight-%, more preferably from 41.5 to 43.5 weight-%, calculated as elemental Si, and a C content (total organic carbon, TOC) preferably in the range of from 0.10 to 0.25 weight-%, more preferably from 0.11 to 0.20 weight-%, more preferably from 0.13 to 0.18 weight-%, calculated as elemental C.

Therefore, the present invention also relates to a process for the preparation of a zeolitic material of zeolitic structure MWW containing Ti (TiMWW) and the TiMWW obtainable or obtained according to this process, said process being defined as above and further comprising (v) acid-treating the TiMWW obtained from (iv) by a process comprising
  (v.1) suspending the TiMWW in a liquid solvent system, preferably water, said liquid solvent system containing at least one acid, preferably containing nitric acid;
  (v.2) heating the suspension obtained from (v.1) to a temperature in the range of from 75 to 125° C. for a time in the range of from 17 to 25 h;
  (v.3) separating the acid-treated TiMWW from the suspension;
  (v.4) preferably drying the TiMWW separated according to (v.3), preferably by spray-drying;
  (v.5) preferably calcining the TiMWW obtained from (v.3) or (v.4), preferably at temperatures in the range of from 500 to 700° C.

Yet further, the present invention relates to a zeolitic material of zeolitic structure MWW containing Ti (TiMWW), having a Ti content in the range of from 1.3 to 1.9 weight-%, more preferably from 1.4 to 1.8 weight-%, more preferably from 1.5 to 1.7 weight-%, calculated as elemental Ti, a Si content preferably in the range of from 39.5 to 45.5 weight-%, more preferably from 40.5 to 44.5 weight-%, more preferably from 41.5 to 43.5 weight-%, calculated as elemental Si, and a C content (total organic carbon, TOC) preferably in the range of from 0.10 to 0.25 weight-%, more preferably from 0.11 to 0.20 weight-%, more preferably from 0.13 to 0.18 weight-%, calculated as elemental C.

The $Het^1MWW$ obtained from (v) can be subjected, for example, to a subsequent step according to which a molding is prepared based on the zeolitic material, for example by suitably mixing the zeolitic material with at least one binder and/or with at least one binder precursor, and optionally at least one pore-forming agent and/or at least one plasticizing agent.

Step (vi)

According to an embodiment of the present invention, the $Het^1MWW$ obtained from (v) is subjected to a further step (vi) wherein at least one second heteroatom $Het^2$ is incorporated into the $Het^1MWW$.

According to this embodiment, the $Het^1MWW$, obtained from (iv) or (v), is preferably suspended in a step (vi.1) in a liquid solvent system which preferably comprises water, more preferably consists of water. Additionally, the liquid solvent system contains at least one suitable source of $Het^2$, also referred to as $Het^2$-containing precursor. As second heteroatom $Het^2$, Ti, Al, Zr, V, Nb, Ta, Cr, Mo, W, Mn, Fe, Co, Ni, Zn, Ga, Ge, In, Sn, Pb, and a mixture of two or more thereof are preferred. Generally, $Het^2$ may be the same as $Het^1$. Preferably, $Het^2$ is different from $Het^1$. According to the present invention, Zn is most preferred.

Concerning preferred sources of zinc, zinc oxide, zinc halides, zinc acetate and zinc nitrate may be mentioned, with zinc acetate and zinc nitrate being especially preferred.

Concerning preferred sources of titanium, titanium oxide, titanium halide and tetraalkylorthotitanates may be mentioned. However, the present invention is not limited thereto. Among these, titanium halides and tetraalkylorthotitanates are more preferred. More preferred are titanium tetrafluoride, tetraethylorthotitanate, tetrapropylorthotitanate, and tetrabutylorthotitanate, with tetrabutylorthotitanate being especially preferred.

Concerning preferred sources of aluminum, alumina, aluminum nitrate may be mentioned, with aluminum nitrate being especially preferred.

Concerning preferred sources of zirconium, zirconium oxide, zirconium halides and zirconium tetraalkoxides may be mentioned. Among these, zirconium halides and zirconium tetraalkoxides are more preferred. More preferred are zirconium tetrafluoride, zirconium tetraethoxide, zirconium tetrabutoxide.

Concerning preferred sources of vanadium, vanadium oxide, vanadium halides and vanadium trialkoxide oxides may be mentioned. Among these, vanadium halides and vanadium trialkoxide oxides are more preferred. More preferred are vanadium trichloride and vanadium oxytriisopropoxide.

Concerning preferred sources of niobium, niobium oxide, niobium halides and niobium tetraalkanoates may be mentioned. More preferred are niobium tetraalkanoates, with niobium tetrakis (2-ethylhexanoate) being especially preferred.

Concerning preferred sources of tantalum, tantalum oxide, tantalum halides and tantalum disulfide may be mentioned, with tantalum disulfide being especially preferred.

Concerning preferred sources of chromium, chromium acetate, chromium nitrate and chromium halides may be mentioned, with chromium nitrate being especially preferred.

Concerning preferred sources of molybdenum, molybdenum oxide, molybdenum halides and molybdenum sulfide may be mentioned, with molybdenum trichloride being especially preferred.

Concerning preferred sources of tungsten, tungsten oxide and tungsten halides may be mentioned, with tungsten tetrachloride being especially preferred.

Concerning preferred sources of manganese, manganese oxide, manganese halides, manganese acetate and manganese acetylacetonate may be mentioned, with manganese trisacetylacetonate being especially preferred.

Concerning preferred sources of iron, iron oxide, iron halides, iron acetate and iron nitrate may be mentioned, with iron nitrate being especially preferred.

Concerning preferred sources of cobalt, cobalt oxide, cobalt halides and cobalt trisacetylacetonate may be mentioned, with cobalt trisacetylacetonate being especially preferred.

Concerning preferred sources of nickel, nickel oxide, nickel halides, nickel nitrate and nickel acetate may be mentioned, with nickel nitrate and nickel acetate being especially preferred.

Concerning preferred sources of gallium, gallium oxide, gallium halides and gallium nitrate may be mentioned, with gallium nitrate, gallium trichloride, and gallium trifluoride being especially preferred.

Concerning preferred sources of indium, indium oxide, indium halides and trialkoxy indium may be mentioned, with indium trichloride, indium trifluoride, and indium triisoproxide being especially preferred.

Concerning preferred sources of tin, tin oxide, tin halides and tetraalkoxy tins may be mentioned, with tin tetrachloride, tin tetrafluoride, tetraethoxy tin, and tetra-tert-butoxy tin being especially preferred.

Concerning preferred sources of lead, lead halides and tetraalkoxy lead may be mentioned, with lead acetate, lead chloride, lead nitrate, lead acetylacetonate, and lead being especially preferred.

In the suspension of (vi.1), the ratio of the $Het^2$ relative to Si in the $Het^1MWW$ is preferably in the range of from 0.001:1 to 0.3:1. In particular as far as the Zn-containing precursor is concerned, it preferred to use it in amount allowing for obtaining the preferred ZnTiMWW described hereinunder.

In a subsequent step (vi.2), the suspension obtained from (vi.1) is heated to a temperature preferably in the range of from 75 to 125° C. more preferably from 85 to 115° C. more preferably from 95 to 105° C. for a time in the range preferably of from 3 to 6 h, more preferably from 3.5 to 5 h. Thus, the $Het^2$ is wet-impregnated onto the $Het^1MWW$.

Alternatively, it is conceivable to prepare a liquid solvent system containing the at least $Het^2$-containing precursor, and incorporate the at least one $Het^2$ into the $Het^1MWW$ by spraying the liquid solvent system onto the $Het^1MWW$. A suitable combination of spraying and wet-impregnation is also possible.

After the impregnation, the obtained $Het^2Het^1MWW$ is preferably suitably separated from the suspension. All methods of separating the $Het^2Het^1MWW$ from the suspension are conceivable. Especially preferably, separation is carried out via filtration, ultrafiltration, diafiltration or centrifugation methods. A combination of two or more of these methods can be applied. According to the present invention, the $Het^2Het^1MWW$ is preferably separated from the suspension by filtration to obtain a filter cake which is preferably subjected to washing, preferably with water. If washing as applied, it may be preferred to continue the washing process until the washing water has a conductivity of less than 1,000 microSiemens/cm, more preferably of less than 900 microSiemens/cm, more preferably of less than 800 microSiemens/cm, more preferably of less than 700 microSiemens/cm.

Subsequently, the preferably washed filter cake is subjected to pre-drying, for example by subjecting the filter cake to a suitable gas stream, preferably a nitrogen stream, for a time preferably in the range of from 5 to 15 h, more preferably from 8 to 12.

Therefore, the present invention relates to above-defined process and zeolitic material obtainable or obtained therefrom, said process further comprising (vi) incorporating at least one second heteroatom ($Het^2$) into the $Het^1MWW$ thereby obtaining a zeolitic material of structure type MWW containing at least two heteroatoms ($Het^2Het^1MWW$) by a process comprising
  (vi.1) suspending the $Het^1MWW$ in a liquid solvent system, preferably water, said liquid solvent system containing at least one $Het^2$-containing precursor, preferably at least one $Het^2$ salt, wherein the second heteroatom ($Het^2$) is preferably selected from the group consisting of Ti, Al, Zr, V, Nb, Ta, Cr, Mo, W, Mn, Fe, Co, Ni, Zn, Ga, Ge, In, Sn, Pb, and a mixture of two or more thereof, more preferably Zn;
  (vi.2) heating the suspension obtained from (v.1) to a temperature in the range of from 75 to 125° C. for a time in the range of from 3 to 6 h;
  (vi.3) optionally separating the $Het^2Het^1MWW$ from the suspension.

As mentioned above, Ti is preferably incorporated as $Het^1$ and Zn is preferably incorporated as $Het^2$. According to the present invention, the ZnTiMWW obtained from impregnation in (vi.2), preferably after washing and preferably pre-drying, has a Zn content preferably in the range of from 1.0 to 2.0 weight-%, calculated as elemental Zn, a Ti content preferably in the range of from 1.0 to 2.0 weight-%, calculated as elemental Ti, a Si content preferably in the range of from 39 to 45 weight-%, calculated as elemental Si, and a C content (total organic carbon, TOC) preferably in the range of from 1.1 to 1.7 weight-%, more preferably from 1.2 to 1.6 weight-%, more preferably from 1.3 to 1.5 weight-%, calculated as elemental C.

Therefore, the present invention relates to a process for the preparation of a zeolitic material of zeolitic structure MWW containing Zn and Ti (ZnTiMWW) and the ZnTiMWW obtainable or obtained by this process, said process further comprising (vi) incorporating Zn into the TiMWW thereby obtaining a zeolitic material of structure type MWW containing Zn and Ti (ZnTiMWW) by a process comprising
  (vi.1) suspending the TiMWW in a liquid solvent system, preferably water, said liquid solvent system containing at least one Zn-containing precursor;
  (vi.2) heating the suspension obtained from (v.1) to a temperature in the range of from 75 to 125° C. for a time in the range of from 3 to 6 h, and optionally washing and pre-drying the obtained ZnTiMWW;
  (vi.3) optionally separating the ZnTiMWW from the suspension.

Yet further, the present invention relates to a zeolitic material of zeolitic structure MWW containing Zn and Ti (ZnTiMWW), having a Zn content preferably in the range of from 1.0 to 2.0 weight-%, calculated as elemental Zn, a Ti content preferably in the range of from 1.0 to 2.0 weight-%, calculated as elemental Ti, a Si content preferably in the range of from 39 to 45 weight-%, calculated as elemental Si, and a C content (total organic carbon, TOC) preferably in the range of from 1.1 to 1.7 weight-%, more preferably from 1.2 to 1.6 weight-%, more preferably from 1.3 to 1.5 weight-%, calculated as elemental C.

The $Het^2Het^1MWW$, preferably the ZnTiMWW obtained from separation in (vi.3), optionally followed by washing and pre-drying, can be passed to a drying stage according to which the preferably pre-dried filter cake is preferably dried at temperatures in the range of from 100 to 300° C. more preferably from 150 to 275° C. more preferably from 200 to 250° C. in a suitable atmosphere such as technical nitrogen, air, or lean air, preferably in air or lean air. It is to be understood that in this context of the present invention, drying is not carried out via a rapid-drying method such as spray-drying but via conventional drying such as drying in a suitable oven or the like. After drying, the $Het^2Het^1MWW$, preferably the ZnTiMWW may be subjected to calcination at temperatures in the range of from 500 to 700° C. more preferably from 550 to 675° C. more preferably from 600 to 675° C. in a suitable atmosphere such as technical nitrogen, air, or lean air, preferably in air or lean air. This calcination is preferably carried out in a muffle furnace, rotary furnace and/or a belt calcination furnace, wherein the calcination is generally carried out for 0.5 hour or more, for example for a time in the range of from 0.25 to 12 hours, preferably from or from 0.5 to 6 hours. During calcination, it is possible to keep the temperatures constant or to change the temperatures continuously or discontinuously. If calcination is effected twice or more, the calcination temperatures in the individual steps may be different or identical. The calcination temperatures are preferably in the range of from up to 700° C. preferably from 400 to 700° C. more preferably from 500 to 700° C. more preferably from 600 to 700° C. more preferably from 625 to 675° C.

The $Het^2Het^1MWW$ thus obtained can be subjected, for example, to a subsequent step according to which a molding is prepared based on the zeolitic material, for example by suitably mixing the zeolitic material with at least one binder and/or with at least one binder precursor, and optionally at least one pore-forming agent and/or at least one plasticizing agent.

According to a preferred embodiment of the present invention, the separated and optionally washed and pre-dried $Het^2Het^1MWW$, preferably the ZnTiMWW, is subjected to rapid-drying, preferably spray-drying in a step (vi.4), preferably followed by a step (vi.5) of calcining the spray-powder obtained from (vi.4). As far as step (vi.4) is concerned, it is preferred that based on the separated and optionally washed and pre-dried $Het^2Het^1MWW$, an aqueous suspension is prepared which is subjected to said spray-drying in (vi.4). From spray-drying, a spray-powder is obtained.

It is generally conceivable that this spray-powder contains the $Het^2Het^1MWW$, preferably the ZnTiMWW in arbitrary amounts. For example, it may be conceivable that the spray powder, apart from the $Het^2Het^1MWW$, preferably the ZnTiMWW, further contains at least one chemical compound acting as binder material. Examples of such binders are metal oxides, such as, for example, $SiO_2$, $Al_2O_3$, $TiO_2$, $ZrO_2$ or MgO or clays or mixtures of two or more of these oxides or mixed oxides of at least two of Si, Al, Ti, Zr, and Mg. Clay minerals and naturally occurring or synthetically produced alumina, such as, for example, alpha-, beta-, gamma-, delta-, eta-, kappa-, chi- or theta-alumina and their inorganic or organometallic precursor compounds, such as, for example, gibbsite, bayerite, boehmite or pseudoboehmite or trialkoxyaluminates, such as, for example, aluminum triisopropylate, are particularly preferred as $Al_2O_3$ binders. Further conceivable binders might be amphiphilic compounds having a polar and a non-polar moiety and graphite. Further binders might be, for example, clays, such as, for example, montmorillonites, kaolins, metakaoline, hectorite, bentonites, halloysites, dickites, nacrites or anaxites. According to this conceivable embodiment, the spray powder may contain, based on the weight of the spray powder, up to 95 weight-% or up to 90 weight-% or up to 85 weight-% or up to 80 weight-% or up to 75 weight-% or up to 70 weight-% or up to 65 weight-% or up to 60 weight-% or up to 55 weight-% or up to 50 weight-% or up to 45 weight-% or up to 40 weight-% or up to 35 weight-% or up to 30 weight-% or up to 25 weight-% or up to 20 weight-% or up to 15 weight-% or up to 10 weight-% or up to 5 weight-% of one or more binder materials.

These binders can be used as such or in the form of suitable precursor compounds which, either during spray-drying and/or the subsequent calcination form the desired binder. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate. In the context of the present invention binders which either completely or partly comprise $SiO_2$, or which are a precursor of $SiO_2$, from which $SiO_2$ is formed, may be preferred. In this context, both colloidal silica and so-called "wet process" silica and so-called "dry process" silica can be used. Particularly preferably this silica is amorphous silica, the size of the silica particles being, for example, in the range of from 5 to 100 nm and the surface area of the silica particles being in the range of from 50 to 500 $m^2/g$. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Tokusil® or Nipsil®. "Dry process" silica is commercially available, inter alia, for example as Aerosil®, Reolosil®, Cab-O—Sil®, Fransil® or ArcSilica®. Inter alia, an ammoniacal solution of colloidal silica is preferred in the present invention.

According to a preferred embodiment of the present invention, no binder and no binder precursor is added to the suspension containing the $Het^2Het^1MWW$, preferably the ZnTiMWW, when the suspension is prepared according to (vi.4). Thus, according to a preferred embodiment of the present invention, the suspension which is subjected to spray-drying according to (ii) does not contain a binder or a precursor of a binder.

If desired, at least on pore forming agent can be added when the suspension according to (vi.4) is prepared. Pore forming agents which may be used are preferably polymers which are dispersible, suspendable or emulsifiable in water or in aqueous solvent mixtures. Such polymers may be polymeric vinyl compounds, such as, for example, polyalkylene oxides, such as polyethylene oxides, polystyrene, polyacrylates, polymethacrylates, polyolefins, polyamides and polyesters, carbohydrates, such as, for example, cellulose or cellulose derivatives, such as, for example, methyl cellulose, or sugars or natural fibers. Further suitable pore forming agents may be, for example, pulp or graphite. If desired with regard the pore characteristics be achieved, a mixture of two or more pore forming agents may be used. In a particularly preferred embodiment of the process according to the invention, the pore forming agents are removed by calcination according to (vi.5) to give the spray powder.

According to a preferred embodiment of the present invention, no pore forming agent is added when the suspension is prepared according to (vi.4). Thus, according to a preferred embodiment of the present invention, the suspension which is subjected to spray-drying according to (vi.4) does not contain a pore forming agent.

As far as the content of the suspension provided in (vi.4) with regard to the $Het^2Het^1MWW$, preferably the ZnTiMWW is concerned, no specific restrictions exist. Preferably, such concentrations are chosen which allow for the preparation of the spray powder as discussed hereinabove. Preferably, the suspension provided in (vi.4) has a solid content in the range of from 5 to 25 weight-%, preferably of from 10 to 20 weight-%. Preferred ranges are from 10 to 15 weight-% or from 11 to 16 weight-% or from 12 to 17 weight-% or from 13 to 18 weight-% or from 14 to 19 weight-% or from 15 to 20 weight-%.

When providing the suspension, the $Het^2Het^1MWW$, preferably the ZnTiMWW can be suspended in any suitable liquid or mixture of two or more liquids. Preferably, the $Het^2Het^1MWW$, preferably the ZnTiMWW is suspended in water or in a mixture of water and at least one further suitable liquid. Most preferably, the $Het^2Het^1MWW$, preferably the ZnTiMWW is suspended in water as sole liquid. Therefore, the suspension provided in (vi.4) is preferably an aqueous suspension.

Therefore, according to a preferred embodiment, the suspension provided and subjected to spray-drying in (vi.4)

essentially consists of the Het²Het¹MWW, preferably the ZnTiMWW provided as discussed hereinabove, and water. Preferably, the content of the suspension, provided subjected to spray-drying in (vi.4), with regard to the Het²Het¹MWW, preferably the ZnTiMWW, and water is at least 95 weight-%, more preferably at least 99 wt.-%, more preferably at least 99.9 weight-%, based on the total weight of the suspension.

According to (vi.4), the suspension provided is preferably subjected to spray-drying.

Generally, spray-drying is a direct method of drying for example slurries or suspensions by feeding a well-dispersed liquid-solid slurry or suspension a suitable atomizer and subsequently flash-drying in a stream of hot gas. Thereby, the slurry or suspension is continuously passed over nozzles, atomizing discs or other suitable atomizing means (reference is made, for example, to Arthur Lefebvre, "Atomisation and Sprays", Hemisphere Publishing Corporation, 1989, ISBN 0-89116-603-3) and sprayed into a drying chamber which is suitably heated with at least one hot gas. Spray-drying is generally carried out continuously, either without or with (agglomerating mode) returning the solid to the spraying compartment. Spray-drying is disclosed, for example, in K. Masters, "Spray Drying Handbook", Longman Scientific & Technical, 1991, ISBN 0-582-06266-7. The atomizer mentioned above can be of several different types. Most common is wheel atomization which uses high-speed rotation of a wheel or a disc to break up the slurry into droplets that spin out from the wheel into a chamber and are flash-dried prior to hitting the chamber walls. The atomization may also be accomplished by single-component nozzles which rely on hydrostatic pressure to force the slurry through a small nozzle. Multi-component nozzles such as two-component nozzles are also used, where gas pressure is used to force the slurry through the nozzle. The use of a rotating sprayer is also conceivable.

According to the present invention, it is especially preferred to employ a drying gas having a temperature in the range of from 100 to 500° C. preferably in the range of from 150 to 450° C. more preferably in the range of from 200 to 400° C. more preferably in the range of from 250 to 350° C. more preferably in the range of from 275 to 325° C. As drying gas, air, lean air or oxygen-nitrogen mixtures with an oxygen content of up to 10 vol. %, preferably of up to 5 vol. %, more preferably of less than 5 vol. %, as, for example, of up to 2 vol. %, may be employed. It is preferred to use inert gases as drying gas. Technical nitrogen is especially preferred as drying gas. The flow rate of the drying gas is preferably in the range of from 400 to 700 kg/h, more preferably from 500 to 600 kg/h, more preferably from 525 to 575 kg/h such as 525, 530, 535, 540, 545, 550, 555, 560, 565, 570, or 575 kg/h.

According to the present invention, it is especially preferred to employ a nozzle gas having a temperature in the range of from 10 to 100° C. preferably in the range of from 15 to 75° C. more preferably in the range of from 20 to 50° C. more preferably in the range of from 20 to 30° C. As nozzle gas, air, lean air or oxygen-nitrogen mixtures with an oxygen content of up to 10 vol.-%, preferably of up to 5 vol.-%, more preferably of less than 5 vol.-%, as, for example, of up to 2 vol.-%, may be employed. It is preferred to use inert gases as nozzle gas. Technical nitrogen is especially preferred as nozzle gas. The flow rate of the nozzle gas is preferably in the range of from 10 to 50 kg/h, more preferably from 15 to 35 kg/h, more preferably from 20 to 25 kg/h.

As nozzle, a two-component nozzle is especially preferred. In particular, such a two-component nozzle has a diameter in the range of from 2 to 6 mm, preferably from 3 to 5 mm, more preferably from 3.5 to 4.5 mm, more preferably from 3.9 to 4.1 mm, more preferably of 4 mm.

Further, it is preferred to use a spray tower configured with a dehumidifier, a filter, and a scrubber, preferably in this sequence, through which configuration the drying gas together with the slurry to be sprayed is passed. According to this embodiment, the temperature of the drying gas as described hereinabove is to be understood as the initial temperature of the drying which is passed to the dehumidifier.

Therefore, the present invention relates to above-defined process, wherein in (vi.4), a spray-apparatus, preferably a spray-tower is used for spray-drying the suspension, said apparatus having at least one spray-nozzle, preferably at least one two-substance nozzle, more preferably one two-substance nozzle, said nozzle having a diameter in the range of from 3.5 to 4.5 mm, preferably from 3.9 to 4.1 mm.

Further, the present invention relates to said process, wherein in (vi.4), a spray-apparatus, preferably a spray-tower is used for spray-drying the suspension, said apparatus being operated with a nozzle gas having a temperature in the range of from 20 to 50° C. preferably of from 20 to 30° C. and a drying gas having a temperature in the range of from 250 to 350° C. preferably of from 275 to 325° C. said nozzle gas preferably being an inert gas, more preferably technical nitrogen, and said drying gas preferably being an inert gas, more preferably technical nitrogen.

The spray powder which is obtained from (vi.4) has a preferred residual moisture content of preferably at least 5 weight-%, more preferably of at least 4 weight-%, more preferably of at least 3 weight-%, more preferably of at least 2 weight-%.

Further, the present invention also relates to the spray powder, obtainable or obtained by the process as discussed above.

According to (vi.5), the spray powder obtained from (vi.4) is optionally calcined. According to the present invention, it is preferred to subject the spray powder obtained from (vi.4) to calcination.

The calcination of the spray powder can be effected under any suitable gas atmosphere, wherein air and/or lean air is/are preferred. Furthermore, the calcinations is preferably carried out in a muffle furnace, rotary furnace and/or a belt calcination furnace, wherein the calcination is generally carried out for 0.5 hour or more, for example for a time in the range of from 0.25 to 12 hours, preferably from or from 0.5 to 6 hours, more preferably from 1 to 3 hours. During calcination, it is possible to keep the temperatures constant or to change the temperatures continuously or discontinuously. If calcination is effected twice or more often, the calcination temperatures in the individual steps may be different or identical. The calcination temperatures are preferably in the range of from up to 700° C. preferably from 400 to 700° C. more preferably from 500 to 700° C. more preferably from 600 to 700° C. more preferably from 625 to 675° C. such as from 625 to 645° C. or from 635 to 655° C. or from 645 to 665° C. or from 655 to 675° C.

Therefore, the present invention relates to a process for the preparation of a zeolitic material of zeolitic structure MWW containing at least one heteroatom Het1 and at least one heteroatom Het² (Het²Het¹MWW), preferably ZnTiMWW, and the Het²Het¹MWW, preferably the ZnTiMWW, obtainable or obtained by this process, said process further comprising (vi) incorporating at least one second heteroatom (Het²), preferably Zn, into the Het¹MWW, preferably the TiMWW, thereby obtaining a zeolitic material of structure type MWW containing at least two heteroatoms (Het²Het¹MWW), preferably ZnTiMWW, by a process comprising (vi.1) suspending the Het¹MWW in a liquid solvent system, preferably water, said liquid solvent system containing at least one Het²-containing precursor, preferably at least one Het² salt, wherein the second heteroatom (Het²) is preferably selected from the group consisting of Ti, Al, Zr, V, Nb, Ta, Cr, Mo, W, Mn, Fe, Co, Ni, Zn, Ga, Ge, In, Sn, Pb, and a mixture of two or more thereof, more preferably Zn;

(vi.2) heating the suspension obtained from (v.1) to a temperature in the range of from 75 to 125° C. for a time in the range of from 3 to 6 h;

(vi.3) separating the Het²Het¹MWW from the suspension;

(vi.4) preferably drying the Het²Het¹MWW separated according to (vi.3), preferably by spray-drying;

(vi.5) optionally calcining the Het²Het¹MWW obtained from (vi.3) or (vi.4), preferably at temperatures in the range of from 500 to 700° C.

From said spray-drying according to step (vi.4), and preferably the subsequent calcination in step (vi.5), a spray-powder is preferably obtained, the particles of which having a Dv10 value of at least 2 micrometer, said spray powder comprising mesopores having an average pore diameter (4V/A) in the range of from 2 to 50 nm as determined by Hg porosimetry according to DIN 66133, and comprising, based on the weight of the spray powder, at least 95 weight-% of a zeolitic material Het²Het¹MWW, preferably ZnTiMWW. The term "Dv10 value" as referred to in the context of the present invention describes the average particle size where 10 vol. % of the particles of the spray powder have a smaller size. Preferably, the Dv10 value is at least 2.5, more preferably at least 3. According to the present invention, the Dv10 values are determined by preparing a suspension of 1.0 g of the spray powder in 100 g deionized water, stirring the suspension for 1 min and measuring the Dv10 value in a Mastersizer S long bed version 2.15, ser. No. 33544-325; supplier: Malvern Instruments GmbH, Herrenberg, Germany, with the following apparatus parameters:

focal width: 300RF mm
beam length: 10.00 mm
module: MS17
shadowing: 16.9%
dispersion model: 3$$D
analysis model: polydisperse
correction: none.

The term "4V/A" as used in this context of the present invention relates to four times the accumulated volume V of the pores between 2 and 50 nm, divided by A which relates to the accumulated surface of the pores between 2 and 50 nm.

According to an especially preferred embodiment of the present invention, the Het²Het¹MWW, preferably the ZnTiMWW containing spray powder contains essentially no other chemical compound than the Het²Het¹MWW, preferably the ZnTiMWW zeolitic material as such. Preferably, the spray powder of the invention comprises, based on the weight of the spray powder, at least 95, more preferably at least 96 weight-%, more preferably at least 97 weight-%, more preferably at least 98 weight-%, more preferably at least 99 weight-%, more preferably at least 99.5 weight-%, more preferably at least 99.7 weight-% of the Het²Het¹MWW, preferably the ZnTiMWW.

According to the present invention, the crystallinity of the Het²Het¹MWW, preferably the ZnTiMWW which is contained in the inventive spray powder, as determined by X-ray diffraction (XRD) analysis, may vary in broad ranges. For example, the crystallinity of the Het²Het¹MWW, preferably the ZnTiMWW may be at least 20%, preferably at least 30%, more preferably at least 40%, more preferably at least 50%, more preferably at least 60%, more preferably at least 70%. According to a preferred embodiment of the present invention, the crystallinity of the Het²Het¹MWW, preferably the ZnTiMWW which is contained in the inventive spray powder is at least 80%, preferably at least 81%, more preferably at least 82%, more preferably at least 83%, more preferably at least 84%, more preferably at least 85%. Each value is to be understood as having a measurement inaccuracy of plus/minus 10%.

Preferably, the zeolitic material of structure type MWW containing at least two heteroatoms Het¹ and Het² (Het²Het¹MWW) according to the present invention has a Het² content in the range of from 1.0 to 2.0 weight-%, calculated as elemental Het² and based on the weight of the Het²Het¹MWW, and having a Het¹ content in the range of from 1.0 to 2.0 weight-%, calculated as elemental Het¹ and based on the weight of the Het²Het¹MWW.

In particular, as far as the preferred ZnTiMWW is concerned which is contained in the spray powder of the present invention, no specific restrictions exist as far as the Zn content of the ZnTiMWW is concerned. Generally, Zn contents, calculated as elemental Zn, in the range of from, for example, up to 5 weight-% are conceivable, with conceivable ranges of from 0.01 to 5 weight-%, or from 0.02 to 4 weight-%, or from 0.05 to 3 weight-%, or from 0.1 to 2 weight-%. Surprisingly, in particular if used as catalytically active material, more particularly if used as catalytically active material in epoxidation processes as described in detail hereinbelow, it was found that it is of particular advantage if the Zn content of the ZnTiMWW is in a narrow range of from 1.0 to 2.0 weight-%, calculated as Zn and based on the weight of the ZnTiMWW. No specific restrictions exist as far as the Ti content of the ZnTiMWW is concerned. Generally, Ti contents, calculated as elemental Ti, in the range of from, for example, up to 5 weight-% are conceivable, with conceivable ranges of from 0.01 to 5 weight-%, or from 0.02 to 4 weight-%, or from 0.05 to 3 weight-%, or from 0.1 to 2 weight-%. In particular if used as catalytically active material, more particularly if used as catalytically active material in epoxidation processes as described in detail hereinbelow, it was found that it is of particular advantage if the Ti content of the ZnTiMWW is in a narrow range of from 1.0 to 2.0 weight-%, calculated as Ti and based on the weight of the ZnTiMWW.

The Het²Het¹MWW thus obtained, in particular the Het²Het¹MWW spray powder, can be subjected, for example, to a subsequent step according to which a molding is prepared based on the zeolitic material, for example by suitably mixing the zeolitic material with at least one binder and/or with at least one binder precursor, and optionally at least one pore-forming agent and/or at least one plasticizing agent.

The zeolitic materials according to the invention, preferably obtained by the process according to the invention, can be used as such for every conceivable purpose such as catalytically active agents, molecular sieves, adsorbents, fillers, starting material for the preparation of moldings, and the like. According to a preferred embodiment, the zeolitic materials are used as catalytically active agent. In particular for the preferred ZnTiMWW, the zeolitic material is used as catalytically active agent, preferably for the preparation of propylene oxide from propene, preferably in acetonitrile as solvent and/or preferably using hydrogen peroxide as oxidizing agent. Also, the present invention relates to an epoxidation process, preferably to a process for the preparation of propylene oxide from propene, more preferably to a process for the preparation of propylene oxide from propene with hydrogen peroxide as oxidizing agent, more preferably to a process for the preparation of propylene oxide from propene with hydrogen peroxide as oxidizing agent in acetonitrile as solvent, in which process the zeolitic material, in particular the ZnTiMWW as described above, preferably obtained from the process as described above is employed as catalyst.

As far as preferred embodiment of the present invention is concerned according to which the zeolitic material has framework structure type MWW, the present invention is preferably characterized by the following embodiments and the combination of these embodiment as indicated by their dependencies:

1. A process for the preparation of a zeolitic material, comprising
   (i) providing a boron-containing zeolitic material of structure type MWW (B-MWW);
   (ii) deboronating the B-MWW by treating the B-MWW with a liquid solvent system thereby obtaining a deboronated B-MWW (MWW);
   wherein the liquid solvent system is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, acetic acid, propionic acid, oxalic acid, and tartaric acid.

2. The process of embodiment 1 wherein in (i), the boron-containing zeolitic material of structure type MWW (B-MWW) is provided by a process comprising
   (a) hydrothermally synthesizing a B-MWW precursor from a synthesis mixture containing at least one silicon source, preferably ammonia stabilized colloidal silica, at least one boron source, preferably boric acid, and at least one template compound, preferably selected from the group consisting of piperidine, hexamethylene imine, and a mixture thereof, to obtain the B-MWW precursor in its mother liquor;
   (b) separating the B-MWW precursor from its mother liquor;
   (c) optionally drying the B-MWW precursor separated according to (b);
   (d) calcining the B-MWW precursor obtained from (b) or (c), preferably at a temperature in the range of from 500 to 700° C. obtaining the B-MWW.

3. The process of embodiment 1 or 2, wherein the liquid solvent system does not contain an inorganic or organic acid, or a salt thereof.

4. The process of any of embodiments 1 to 3, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, the liquid solvent system preferably being water.

5. The process of any of embodiments 1 to 4, wherein the treating according to (ii) is carried out at a temperature in the range of from 50 to 125° C.

6. The process of any of embodiments 1 to 5, wherein the treating according to (ii) is carried out for a time in the range of from 6 to 20 h.

7. The process of any of embodiments 1 to 6, wherein the treating according to (ii) is carried out in at least 2 separate steps, wherein at least 2 treating steps, the MWW is dried, preferably at a temperature in the range of from 100 to 150° C.

8. The process of any of embodiments 1 to 7, further comprising
   (iii) post-treating the MWW obtained from (ii) by a process comprising
   (iii.1) separating the MWW from the liquid solvent system;
   (iii.2) preferably drying the separated MWW, preferably by spray-drying;
   (iii.3) optionally calcining the MWW obtained from (iii.1) or (iii.2), preferably at temperatures in the range of from 500 to 700° C.

9. The process of any of embodiments 1 to 8, preferably of embodiment 8, further comprising
   (iv) incorporating at least one first heteroatom (Het') into the MWW thereby obtaining a zeolitic material of structure type MWW containing at least one heteroatom (Het$^1$MWW) by a process comprising
   (iv.1) preparing a synthesis mixture containing the MWW obtained according to (ii) or (iii), preferably (iii), a template compound, preferably selected from the group consisting of piperidine, hexamethylene imine, and a mixture thereof, and at least one source of at least one heteroatom (Het'), wherein the heteroatom (Het') is preferably selected from the group consisting of Ti, Al, Zr, V, Nb, Ta, Cr, Mo, W, Mn, Fe, Co, Ni, Zn, Ga, Ge, In, Pb, and a mixture of two or more thereof, more preferably Ti;
   (iv.2) hydrothermally synthesizing the Het$^1$MWW from the synthesis mixture obtained from (iv.1) thereby obtaining the Het$^1$MWW in its mother liquor;
   (iv.3) separating the Het$^1$MWW from its mother liquor;
   (iv.4) preferably drying the Het$^1$MWW separated according to (iv.3), preferably by spray-drying;
   (iv.5) optionally calcining the Het$^1$MWW obtained from (iv.3) or (iv.4), preferably at temperatures in the range of from 500 to 700° C.

10. The process of embodiment 9, further comprising
    (v) acid-treating the Het$^1$MWW obtained from (iv) by a process comprising
    (v.1) suspending the Het$^1$MWW in a liquid solvent system, preferably water, said liquid solvent system containing at least one acid, preferably containing nitric acid;
    (v.2) heating the suspension obtained from (v.1) to a temperature in the range of from 75 to 125° C. for a time in the range of from 17 to 25 h;
    (v.3) separating the acid-treated Het$^1$MWW from the suspension;
    (v.4) preferably drying the Het$^1$MWW separated according to (v.3), preferably by spray-drying;
    (v.5) preferably calcining the Het$^1$MWW obtained from (v.3) or (v.4), preferably at temperatures in the range of from 500 to 700° C.

11. The process of embodiment 9 or 10, further comprising
    (vi) incorporating at least one second heteroatom (Het$^2$) into the Het$^1$MWW thereby obtaining a zeolitic material of structure type MWW containing at least two heteroatoms (Het$^2$Het$^1$MWW) by a process comprising
    (vi.1) suspending the Het$^1$MWW in a liquid solvent system, preferably water, said liquid solvent system containing at least one Het$^2$-containing precursor, preferably at least one Het$^2$ salt, wherein the second heteroatom (Het$^2$) is preferably selected from the group consisting of Ti, Al, Zr, V, Nb, Ta, Cr, Mo, W, Mn, Fe, Co, Ni, Zn, Ga, Ge, In, Sn, Pb, and a mixture of two or more thereof, more preferably Zn;

(vi.2) heating the suspension obtained from (v.1) to a temperature in the range of from 75 to 125° C. for a time in the range of from 3 to 6 h;
(vi.3) separating the Het²Het¹MWW from the suspension;
(vi.4) preferably drying the Het²Het¹MWW separated according to (vi.3), preferably by spray-drying;
(vi.5) optionally calcining the Het²Het¹MWW obtained from (vi.3) or (vi.4), preferably at temperatures in the range of from 500 to 700° C.

12. A zeolitic material, obtainable or obtained by a process according to any of embodiments 1 to 11.

13. The zeolitic material of embodiment 12, obtainable or obtained by a process according to embodiment 11, the zeolitic material being Het²Het¹MWW, preferably ZnTiMWW.

14. A zeolitic material of structure type MWW containing at least two heteroatoms Het¹ and Het² (Het²Het¹MWW), having a Het² content in the range of from 1.0 to 2.0 weight-%, calculated as elemental Het² and based on the weight of the Het²Het¹MWW, and having a Het¹ content in the range of from 1.0 to 2.0 weight-%, calculated as elemental Het¹ and based on the weight of the Het²Het¹MWW.

15. The zeolitic material of embodiment 14, wherein Het¹ is Ti and Het² is Zn.

16. The zeolitic material of any of embodiments 12 to 15, being contained in a spray powder.

17. The zeolitic material of embodiment 16, wherein the particles of the spray powder have a Dv10 value of at least 2 micrometer, said spray powder comprising mesopores having an average pore diameter (4V/A) in the range of from 2 to 50 nm as determined by Hg porosimetry according to DIN 66133, and comprising, based on the weight of the spray powder, at least 95 weight-% of the Het²Het¹MWW.

18. Use of a zeolitic material according to any of embodiments 12 to 17 as catalytically active agent or a precursor thereof.

19. The use of embodiment 18, wherein the zeolitic material is Het²Het¹MWW, preferably ZnTiMWW, as catalytically active agent, preferably for the preparation of propylene oxide from propene, preferably in acetonitrile as solvent and/or preferably using hydrogen peroxide as oxidizing agent.

20. A process for the preparation of propylene oxide, preferably in acetonitrile as solvent and/or preferably using hydrogen peroxide as oxidizing agent, wherein a zeolitic material according to any of embodiments 12 to 17, preferably ZnTiMWW, is employed as catalytically active agent.

According to a further aspect, the present invention is preferably characterized by the following embodiments and the combination of these embodiment as indicated by their dependencies:

I. A process for the preparation of a zeolitic material, comprising
(i) providing a boron-containing zeolitic material (B-Zeolite);
(ii) deboronating the B-Zeolite with a liquid solvent system thereby obtaining a deboronated B-Zeolite (Zeolite);
wherein the liquid solvent system is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, acetic acid, propionic acid, oxalic acid, and tartaric acid.

II. The process of embodiment I, wherein the boron-containing zeolitic material B-Zeolite provided in (i) is either a boron-containing zeolitic material of structure type MWW (B-MWW) or a boron-containing zeolitic material which is not a boron-containing zeolitic material of structure type MWW (B-MWW), preferably a boron-containing zeolitic material of structure type MWW (B-MWW), BEA (B-BEA), MFI (B-MFI), CHA (B-CHA), MOR (B-MOR), MTW (B-MTW), RUB (B-RUB), LEV (B-LEV), FER (B-FER), MEL (B-MEL), or RTH (B-RTH), more preferably of structure type MWW (B-MWW), and wherein the deboronated B-Zeolite (Zeolite) obtained in (ii) is either a deboronated B-MWW (MWW) or a deboronated B-Zeolite (Zeolite) which is not MWW, preferably a deboronated B-MWW (MWW), B-BEA (BEA), B-MFI (MFI), B-CHA (CHA), B-MOR (MOR), B-MTW (MTW), B-RUB (RUB), B-LEV (LEV), B-FER (FER), B-MEL (MEL), B-RTH (RTH), more preferably a deboronated B-MWW (MWW).

III. The process of embodiment I or II, wherein in (i), the boron-containing zeolitic material B-Zeolite is provided by a process comprising
(a) hydrothermally synthesizing the B-Zeolite from a synthesis mixture containing at least one silicon source, at least one boron source, and at least one template compound, to obtain the B-Zeolite in its mother liquor;
(b) separating the B-Zeolite from its mother liquor;
(c) preferably drying the B-Zeolite separated according to (b), preferably spray-drying the B-Zeolite separated according to (b);
(d) optionally calcining the B-Zeolite obtained from (b) or (c), preferably at a temperature in the range of from 500 to 700° C.

IV. The process of embodiment III, wherein in (i), the boron-containing zeolitic material is B-MWW, provided by a process comprising
(a) hydrothermally synthesizing a B-MWW precursor from a synthesis mixture containing ammonia stabilized colloidal silica as at least one silicon source, boric acid as at least one boron source, and at least one template compound selected from the group consisting of piperidine, hexamethylene imine, and a mixture thereof, to obtain the B-MWW precursor in its mother liquor;
(b) separating the B-MWW precursor from its mother liquor;
(c) preferably drying the B-MWW precursor separated according to (b), preferably spray-drying the B-MWW separated according to (b);
(d) calcining the B-MWW precursor obtained from (b) or (c), preferably at a temperature in the range of from 500 to 700° C. obtaining the B-MWW.

V. The process of any of embodiments I to IV, wherein the B-Zeolite provided in (i) is an aluminum-free zeolitic material.

VI. The process of any of embodiments I to V, wherein the B-Zeolite provided in (i) has a B content in the range of from 0.5 to 5.0 weight-%, more preferably from 0.75 to 4.0 weight-%, more preferably from 1.0 to 3.0 weight-%, calculated as element and based on the total weight of the B-Zeolite.

VII. The process of any of embodiments I to VI, wherein the B-Zeolite provided in (i) is provided in the form of a spray-powder or a spray-granulate.

VIII. The process of any of embodiments I to VII, wherein the liquid solvent system does not contain an inorganic or organic acid, or a salt thereof.
IX. The process of any of embodiments I to VIII, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof.
X. The process of any of embodiments I to IX, wherein the liquid solvent system is water.
XI. The process of any of embodiments I to X, wherein the deboronating according to (ii) is carried out at a temperature in the range of from 50 to 125° C.
XII. The process of any of embodiments I to XI, wherein the deboronating according to (ii) is carried out for a time in the range of from 6 to 20 h.
XIII. The process of any of embodiments I to XII, wherein in the deboronating according to (ii), the weight ratio of B-Zeolite relative to the liquid solvent system is in the range of from 1:5 to 1:40, preferably from 1:10 to 1:30, more preferably from 1:10 to 1:20.
XIV. The process of any of embodiments I to XIII, wherein the deboronating according to (ii) is carried out in at least 2 separate steps, wherein between at least 2 treating steps, the Zeolite, preferably the MWW or the Zeolite which is not MWW, more preferably the MWW, BEA, MFI, CHA, MOR, MTW, RUB, LEV, FER, MEL, or RTH, more preferably the MWW is dried, preferably at a temperature in the range of from 100 to 150° C.
XV. The process of any of embodiments I to XIV, wherein the liquid solvent system is water and the deboronating according to (ii) is carried out at a temperature in the range of from 95 to 105° C. preferably from 95 to 100° C. for a time in the range of from 8 to 15 h, preferably from 9 to 12 h, wherein preferably, the deboronating according to (ii) is carried out under reflux.
XVI. The process of any of embodiments I to XV, wherein during the deboronation according to (ii), the liquid solvent system is stirred.
XVII. The process of any of embodiments I to XVI, and wherein the Zeolite obtained in (ii) has a B content of at most 0.2 weight-%, more preferably at most 0.1 weight-%, calculated as element and based on the total weight of the Zeolite.
XVIII. The process of any of embodiments I to XVII, further comprising
  (iii) post-treating the Zeolite, preferably the MWW or the Zeolite which is not MWW, more preferably the MWW, BEA, MFI, CHA, MOR, MTW, RUB, LEV, FER, MEL, or RTH, more preferably the MWW, obtained from (ii) by a process comprising
    (iii.1) separating the Zeolite, preferably the MWW or the Zeolite which is not MWW, more preferably the MWW, BEA, MFI, CHA, MOR, MTW, RUB, LEV, FER, MEL, or RTH, more preferably the MWW from the liquid solvent system;
    (iii.2) preferably drying the separated Zeolite, preferably the separated MWW or the separated Zeolite which is not MWW, more preferably the separated the MWW, BEA, MFI, CHA, MOR, MTW, RUB, LEV, FER, MEL, or RTH, more preferably the separated MWW, preferably by spray-drying;
    (iii.3) optionally calcining the Zeolite, preferably the MWW or the Zeolite which is not MWW, more preferably the MWW, BEA, MFI, CHA, MOR, MTW, RUB, LEV, FER, MEL, or RTH, more preferably the MWW, obtained from (iii.1) or (iii.2), preferably at temperatures in the range of from 500 to 700° C.
XIX. A zeolitic material, obtainable or obtained by a process according to any of embodiments I to XVIII.
XX. A deboronated zeolitic material (Zeolite), preferably the zeolitic material of embodiment XVI, containing at most 0.2 weight-%, more preferably at most 0.1 weight-% of boron, calculated as element and based on the total weight of the Zeolite.
XXI. The zeolitic material of embodiment XIX or XX, which zeolitic material is in the form of a spray-powder or a spray-granulate.
XXII. Use of a zeolitic material according to any of embodiments XIX to XXI as catalytically active agent, as a precursor for the preparation of a catalytically active agent, as a catalyst component such as a support for a catalytically active agent or as a component of a washcoat applied on a carrier.

The present invention is illustrated by the following examples.

EXAMPLES

Example 1

Preparation of a Deboronated MWW 1.1 Preparation of Boron-Containing MWW 470.4 kg de-ionized water were provided in a vessel. Under stirring at 70 rpm (rounds per minute), 162.5 kg boric acid were suspended in the water. The suspension was stirred for another 3 h. Subsequently, 272.5 kg piperidine were added, and the mixture was stirred for another hour. To the resulting solution, 392.0 kg Ludox® AS-40 were added, and the resulting mixture was stirred at 70 rpm for another hour.

The finally obtained mixture was transferred to a crystallization vessel and heated to 170° C. within 5 h under autogenous pressure and under stirring (50 rpm). The temperature of 170° C. was kept essentially constant for 120 h; during these 120 h, the mixture was stirred at 50 rpm. Subsequently, the mixture was cooled to a temperature of from 50-60° C. within 5 h. The aqueous suspension containing B-MWW had a pH of 11.3 as determined via measurement with a pH electrode.

From said suspension, the B-MWW precursor was separated by filtration. The filter cake was then washed with de-ionized water until the washing water had a conductivity of less than 700 microSiemens/cm From the thus obtained filter cake, an aqueous suspension was prepared having a solid content of 15 weight-%. This suspension was subjected to spray-drying in a spray-tower with the following spray-drying conditions:
  drying gas, nozzle gas: technical nitrogen
  temperature drying gas:
  temperature spray tower (in): 288-291° C.
  temperature spray tower (out): 157-167° C.
  temperature filter (in): 150-160° C.
  temperature scrubber (in): 40-48° C.
  temperature scrubber (out): 34-36° C.
  pressure difference filter: 8.3-10.3 mbar nozzle:
  top-component nozzle supplier Gerig; size 0
  nozzle gas temperature: room temperature
  nozzle gas pressure: 2.5 bar
  operation mode: nitrogen straight
  apparatus used: spray tower with one nozzle
  configuration: spray tower-filter-scrubber
  gas flow: 1,900 kg/h filter material: Nomex® needle-felt 20 m²
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 650° C. for 2 h. The calcined material had a boron (B) content of 1.9 wt.-%, a silicon (Si) content of 41 wt.-%, and a total organic carbon (TOC) content of 0.18 wt.-%.

1.2 Preparation of Deboronated MWW a) Deboronation

Based on the spray-dried material obtained according to Example 1.1 above, 4 batches of deboronated zeolite MWW were prepared. In each of the first 3 batches, 35 kg of the spray-dried material obtained according to Example 1.1 and 525 kg water were employed. In the fourth batch, 32 kg of the spray-dried material obtained according to Example 1.1 and 480 kg water were employed. In total, 137 kg of the spray-dried material obtained according to Example 1.1 and 2025 kg water were employed.

For each batch, the respective amount of water was passed into a vessel equipped with a reflux condenser. Under stirring at 40 r.p.m., the given amount of the spray-dried material was suspended into the water. Subsequently, the vessel was closed and the reflux condenser put into operation. The stirring rate was increased to 70 r.p.m. Under stirring at 70 r.p.m., the content of the vessel was heated to 100° C. within 10 h and kept at this temperature for 10 h. Then, the content of the vessel was cooled to a temperature of less than 50° C.

The resulting deboronated zeolitic material of structure type MWW was separated from the suspension by filtration under a nitrogen pressure of 2.5 bar and washed four times with deionized water. After the filtration, the filter cake was dried in a nitrogen stream for 6 h.

The deboronated zeolitic material obtained in 4 batches (625.1 kg nitrogen-dried filter cake in total) had a residual moisture content of 79%, as determined using an IR (infrared) scale at 160° C.

b) Spray-Drying of the Nitrogen-Dried Filter Cake

From the nitrogen-dried filter cake having a residual moisture content of 79% obtained according to section a) above, an aqueous suspension was prepared with deionized water, the suspension having a solid content of 15 wt.-%. This suspension was subjected to spray-drying in a spray-tower with the following spray-drying conditions:

drying gas, nozzle gas: technical nitrogen
temperature drying gas:
temperature spray tower (in): 304° C.
temperature spray tower (out): 147-150° C.
temperature filter (in): 133-141° C.
temperature scrubber (in): 106-114° C.
temperature scrubber (out): 13-20° C.
pressure difference filter: 1.3-2.3 mbar
nozzle:
top-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m²
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged.

The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried MWW material obtained had a B content of 0.08 wt.-%, an Si content of 42 wt.-%, and a TOC of 0.23 wt.-%.

Example 2

Preparation of Het$^1$MWW, with Het$^1$=Ti

Based on the deboronated MWW material as obtained according to Example 1, a zeolitic material of structure type MWW containing titanium (Ti) was prepared, referred to in the following as TiMWW. The synthesis was performed in two experiments, described in the following as a) and b):

a) First Experiment

Starting materials:
deionized water: 244.00 kg
piperidine: 118.00 kg
tetrabutylorthotitanate: 10.90 kg
deboronated zeolitic material: 54.16 kg 54.16 kg of the deboronated zeolitic material of structure type MWW were transferred in to a first vessel A.

In a second vessel B, 200.00 kg deionized water were transferred and stirred at 80 r.p.m. 118.00 kg piperidine were added under stirring, and during addition, the temperature of the mixture increased for about 15° C. Subsequently, 10.90 kg tetrabutylorthotitanate and 20.00 kg deionized water were added. Stirring was then continued for 60 min.

The mixture of vessel B was then transferred into vessel A, and stirring in vessel A was started (70 r.p.m.). 24.00 kg deionized water were filled into vessel A and transferred to vessel B.

The mixture in vessel B was then stirred for 60 min at 70 r.p.m. At the beginning of the stirring, the pH of the mixture in vessel B was 12.6, as determined with a pH electrode.

After said stirring at 70 r.p.m., the frequency was decreased to 50 r.p.m., and the mixture in vessel B was heated to a temperature of 170° C. within 5 h. At a constant stirring rate of 50 r.p.m., the temperature of the mixture in vessel B was kept at an essentially constant temperature of 170° C. for 120 h under autogenous pressure. During this crystallization of TiMWW, a pressure increase of up to 10.6 bar was observed. Subsequently, the obtained suspension containing TiMWW having a pH of 12.6 was cooled within 5 h.

The cooled suspension was subjected to filtration, and the separated mother liquor was transferred to waste water discharge. The filter cake was washed four times with deionized water under a nitrogen pressure of 2.5 bar. After the last washing step, the filter cake was dried in a nitrogen stream for 6 h.

From 246 kg of said filter cake, an aqueous suspension was prepared with deionized water, the suspension having a solid content of 15 wt.-%. This suspension was subjected to spray-drying in a spray-tower with the following spray-drying conditions:

drying gas, nozzle gas: technical nitrogen
temperature drying gas:
temperature spray tower (in): 304° C.
temperature spray tower (out): 147-152° C.
temperature filter (in): 133-144° C.
temperature scrubber (in): 111-123° C.
temperature scrubber (out): 12-18° C.
pressure difference filter: 1.8-2.8 mbar
nozzle:
top-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m²
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried TiMWW material obtained from the first experiment had a Si content of 37 wt.-%, a Ti content of 2.4 wt.-%, and a TOC of 7.5 wt.-%.

b) Second Experiment

The second experiment was carried out in the same way as the first experiment described in section a) above. The spray-dried TiMWW material obtained from the second experiment had a Si content of 36 wt.-%, a Ti content of 2.4 wt.-%, a TOC of 8.0 wt.-%

Acid Treatment of TiMWW

Each of the two spray-dried TiMWW materials as obtained in the first and the second experiment described in Example 2, sections a) and b) above was subjected to acid treatment as described in the following in sections a) and b). In section c) hereinunder, it is described how a mixture of the materials obtained from a) and b) are spray-dried. In section d) hereinunder, it is described how the spray-dried material is calcined.

a) Acid Treatment of the Spray-Dried Material Obtained According to Example 2, Section a)

Starting materials:
deionized water: 690.0 kg
nitric acid (53%): 900.0 kg
spray-dried Ti-MWW a): 53.0 kg 670.0 kg deionized water were filled in a vessel. 900 kg nitric acid were added, and 53.0 kg of the spray-dried TiMWW were added under stirring at 50 r.p.m. The resulting mixture was stirred for another 15 min. Subsequently, the stirring rate was increased to 70 r.p.m.

Within 1 h, the mixture in the vessel was heated to 100° C. and kept at this temperature and under autogenous pressure for 20 h under stirring. The thus obtained mixture was then cooled within 2 h to a temperature of less than 50° C.

The cooled mixture was subjected to filtration, and the filter cake was washed six times with deionized water under a nitrogen pressure of 2.5 bar. After the last washing step, the filter cake was dried in a nitrogen stream for 10 h. The washing water after the sixth washing step had a pH of about 2.7. 225.8 kg dried filter cake were obtained.

b) Acid Treatment of the Spray-Dried Material Obtained According to Example 2, Section b)

Starting materials:
deionized water: 690.0 kg
nitric acid (53%): 900.0 kg
spray-dried Ti-MWW b): 55.0 kg The acid treatment of the spray-dried material obtained according to Example 2, section b) was carried in the same way as the acid treatment of the spray-dried material obtained according to Example 2, section a) as described above. The washing water after the sixth washing step had a pH of about 2.7. 206.3 kg dried filter cake were obtained.

c) Spray-Drying of the Mixture of the Acid-Treated Materials Obtained from a) and b)

From 462.1 kg of the mixture of the filter cakes obtained from a) and b), an aqueous suspension was prepared with deionized water, the suspension having a solid content of 15 wt.-%. This suspension was subjected to spray-drying in a spray-tower with the following spray-drying conditions:

drying gas, nozzle gas: technical nitrogen
temperature drying gas:
temperature spray tower (in): 304-305° C.
temperature spray tower (out): 151° C.
temperature filter (in): 141-143° C.
temperature scrubber (in): 109-118° C.
temperature scrubber (out): 14-15° C.
pressure difference filter: 1.7-3.8 mbar
nozzle:
top-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m²
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried acid-treated TiMWW material had a Si content of 42 wt.-%, a Ti content of 1.6 wt.-%, and a TOC of 1.7 wt.-%.

d) Calcination of the Spray-Dried Material Obtained According to c)

The spray-dried material was then subjected to calcination at 650° C. in a rotary furnace for 2 h. The calcined material had a Si content of 42.5 wt.-%, a Ti content of 1.6 wt.-% and a TOC content of 0.15 wt.-%. The Langmuir surface are determined via nitrogen adsorption at 77 K according to DIN 66134 was 612 m²/g, the multipoint BET specific surface area determined via nitrogen adsorption at 77 K according to DIN 66131 was 442 m²/g. The total intrusion volume determined according to Hg porosimetry according to DIN 66133 was 4.9 ml/g (milliliter/gram), the respective total pore area 104.6 m²/g. The degree of crystallization determined via XRD was 80%, the average crystallite size 31 nm. The XRD of the material is shown in FIG. 1.

Example 3

Preparation of B-MWW Zeolitic Materials 3.1 22.050 kg deionized water and 8.515 kg piperidine were mixed in a stirred tank. 5.076 kg boric acid were added under stirring, and stirring was continued for 30 min. Then, 4.900 kg fumed silica (Aerosil® 200) were added, and stirring was continued for 2 h. The stirring rate was 150 r.p.m. Subsequently, the resulting suspension was heated within 2 h to a temperature of 170° C. and kept at this temperature for 120 h. The pressure increase was 8.9 bar.

After the synthesis, the suspension was subjected to filtration using a suction filter. The filter cake was washed with deionized water, and the pH of the filtrate was 8.5. The thus washed filter cake was dried at 100° C. by subjecting it to nitrogen which was applied with a flow rate of 6 m³/h for 24 h. Thereafter, the filter cake obtained was subjected to further drying for 2 h and calcined at 600° C. for 10 h.

The obtained B-MWW had a B content of 2.2 weight-%, a Si content of 41 weight-%, and a C content (TOC (total organic carbon) of less than 0.2 weight-%, in each case calculated as element and based on the total weight of the B-MWW. The XRD of the obtained B-MWW is shown in FIG. 2, an SEM picture (secondary electrons) is shown in FIG. 3.

3.2 In a beaker, 203.1 g boric acid were dissolved in 340.6 g piperidine and 588.0 g water. The mixture was stirred for 20 min. Then, under stirring, 490.0 g ammonia-stabilized colloidal silica (Ludox® AS 40) were added. The resulting mixture was stirred for 1 h. The liquid gel was then passed into an autoclave. In the autoclave, the gel was heated to a temperature of 170° C. within 1 h and kept at this temperature for 120 h. A white suspension was obtained.

The suspension was subjected to filtration and washed with deionized water. The washed filter cake was dried at 100° C. for 16 h. The temperature was then increased to 600° C. with a temperature rate of 2° C./min, and calcination was performed at this temperature of 600° C. for 10 h in air.

The obtained B-MWW had a B content of 1.3 weight-%, and a Si content of 42 weight-%.

3.3 In a beaker, 181.3.1 g boric acid were dissolved in 304.1 g piperidine and 525.0 g water. The mixture was stirred for 20 min. Then, under stirring, 437.5 g ammonia-stabilized colloidal silica (Ludox® AS 40) were added. The resulting mixture was stirred for 1 h. The liquid gel was then passed into an autoclave. In the autoclave, the gel was heated to a temperature of 170° C. within 1 h and kept at this temperature for 120 h. A white suspension was obtained.

The suspension was subjected to filtration and washed with deionized water. The washed filter cake was dried at 100° C. for 16 h. The temperature was then increased to 600° C. with a temperature rate of 2° C./min, and calcination was performed at this temperature of 600° C. for 10 h in air.

The obtained B-MWW had a B content of 1.3 weight-%, and a Si content of 42 weight-%. The XRD of the obtained B-MWW is shown in FIG. 4, an SEM picture (secondary electrons) is shown in FIG. 5.

Example 4

Deboronation of B-MWW Zeolitic Materials 4.1 A suspension of 100 g of the material obtained according to Example 3.1 in 1000 g deionized water was refluxed for 2 h under stirring. Thereafter, stirring was stopped, and the suspension subjected to filtration. From the solid obtained, a sample was taken and subjected to drying at 120° C. For the sample, the B content was determined. The remaining solid was suspended in 1000 g deionized water and heated at 100° C. fore 1 h. The process was repeated 4 times in total. The finally obtained solid was subjected to drying at 100° C. for 24 h. In the following table, the B content of the samples and the finally obtained solid is shown:

| time/h (subjecting to heating at 100° C. under reflux) | B content (in weight-%, calculated as element and based on total weight of solid) |
| --- | --- |
| 0 | 2.0 |
| 1 | not determined |
| 2 | 0.37 |
| 3 | 0.18 |
| 4 | 0.13 |
| 5 | 0.12 |

4.2 A suspension of 166 g of the B-MWW obtained from Example 3.2 in 4,980.0 g deionized water was refluxed at 100° C. under stirring at 160 r.p.m. for 20 h. The white suspension was subjected to filtration and washed with deionized water. The obtained solid was subjected to drying at 100° C. for 16 h. The B content of the obtained solid, calculated as element, was less than 0.05 weight-%, the Si content, calculated as element, was 44 weight-%.

4.3 A suspension of 30.0 g of the B-MWW obtained from Example 3.2 in 900.0 g methanol was refluxed at 64° C. under stirring at 200 r.p.m. for 20 h. The white suspension was subjected to filtration and washed with deionized water. The obtained solid was subjected to drying at 100° C. for 16 h. The B content of the obtained solid, calculated as element, was 0.39 weight-%, the Si content, calculated as element, was 42 weight-%.

Compared to the deboronation with water according to 4.2, a higher B content of the deboronated material was obtained. Nevertheless, it could be shown that a liquid solvent system consisting of a monohydric alcohol, namely methanol, can be used for considerably decreasing the B content of a B-MWW zeolitic material, and thus for deboronating a B-MWW zeolitic material.

Comparative Example

The B-MWW zeolitic material as obtained from Example 3.3 was subjected to deboronation making use of the prior art teaching, i.e. a liquid solvent system containing nitric acid was employed as deboronating agent. This B-MWW zeolitic material is essentially identical to the B-MWW zeolitic material as obtained from Example 3.2; therefore, the results according this comparative example can be easily compared with the results of the deboronation according to Example 4.2.

A suspension of 150 g of the B-MWW obtained from Example 3.3 in 4500 ml of 6 mol/l nitric acid (aqueous solution) was refluxed at 100° C. under stirring at 200 r.p.m. for 20 h. The white suspension was subjected to filtration and washed with deionized water. The obtained solid was subjected to drying at 100° C. for 16 h. The B content of the obtained solid, calculated as element, was 0.09 weight-%, the Si content, calculated as element, was 40 weight-%.

Thus, under otherwise identical conditions (deboronation time: 20 h; deboronation temperature: 100° C.; deboronation stirring rate: 200 r.p.m., drying time: 16 h; drying temperature: 100° C.), it was found that the inventive deboronation with water as liquids solvent system leads to a deboronated material having a lower B content (less than 0.05 weight-%) than the material deboronated according to the prior art (0.09 weight-%).

Example 5

Deboronation of B-MWW Zeolitic Materials 5.1 Preparation of a B-MWW Material (Zeolitic Material of Framework Structure MWW)

480 kg de-ionized water were provided in a vessel. Under stirring at 70 rpm (rounds per minute), 166 kg boric acid were suspended in the water at room temperature. The suspension was stirred for another 3 h at room temperature. Subsequently, 278 kg piperidine were added, and the mixture was stirred for another hour. To the resulting solution, 400 kg Ludox® AS-40 were added, and the resulting mixture was stirred at 70 rpm for another hour at room temperature. The finally obtained mixture was transferred to a crystallization vessel and heated to 170° C. within 5 h under autogenous pressure and under stirring (50 rpm). The temperature of 170° C. was kept essentially constant for 120 h. During these 120 h, the mixture was stirred at 50 rpm. Subsequently, the mixture was cooled to a temperature of from 50-60° C. The aqueous suspension containing B-MWW precursor had a pH of 11.3 as determined via measurement with a pH-sensitive electrode. From said suspension, the B-MWW precursor was separated by filtration. The filter cake was then washed with de-ionized water at room temperature until the washing water had a conductivity of less than 700 microSiemens/cm.

The filter cake was then mixed with water to obtain a suspension having a solid content of 15 weight-%. This suspension was subjected to spray-drying in a spray-tower with the following spray-drying conditions:
    drying gas, nozzle gas: technical nitrogen
    temperature drying gas:
        temperature spray tower (in): 235° C.
        temperature spray tower (out): 140° C.
    nozzle:
        top-component nozzle supplier Gerig; size 0
        nozzle gas temperature: room temperature
        nozzle gas pressure: 1 bar
    operation mode: nitrogen straight
    apparatus used: spray tower with one nozzle
    configuration: spray tower-filter-scrubber
    gas flow: 1,500 kg/h
    filter material: Nomex® needle-felt 20 m$^2$
    dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 600° C. for 10 h. The obtained B-MWW had a B content, calculated as element, of 1.9 weight-%, and a Si content, calculated as element, of 41 weight-%.

5.2 Deboronation 9 kg of de-ionized water and 600 g of the spay-dried material obtained according to Example 5.1 were refluxed at 100° C. under stirring at 250 r.p.m. for 10 h. The resulting deboronated zeolitic material was separated from the suspension by filtration and washed with 8 l deionized water at room temperature. After the filtration, the filter cake was dried at a temperature of 120° C. for 16 h. The obtained B-MWW had a B content, calculated as element, of 0.07 weight-%, and a Si content, calculated as element, of 42 weight-%.

Example 6

Deboronation of B-BEA Zeolitic Materials 6.1 Preparation of a B-BEA Material (Zeolitic Material of Framework Structure BEA)

209 kg de-ionized water were provided in a vessel. Under stirring at 120 rpm (rounds per minute), 355 kg tetraethylammonium hydroxide were added and the suspension was stirred for 10 minutes at room temperature. Thereafter, 61 kg boric acid were suspended in the water and the suspension was stirred for another 30 minutes at room temperature. Subsequently, 555 kg Ludox® AS-40 were added, and the resulting mixture was stirred at 70 rpm for another hour at room temperature. The liquid gel had a pH of 11.8 as determined via measurement with a pH electrode. The finally obtained mixture was transferred to a crystallization vessel and heated to 160° C. within 6 h under a pressure of 7.2 bar and under stirring (140 rpm). Subsequently, the mixture was cooled to room temperature. The mixture was again heated to 160° C. within 6 h and stirred at 140 rpm for additional 55 h. The mixture was cooled to room temperature and subsequently, the mixture was heated for additional 45 h at a temperature of 160° C. under stirring at 140 rpm. 7800 kg de ionized water were added to 380 kg of this suspension. The suspension was stirred at 70 rpm and 100 kg of a 10 weight-% HNO$_3$ aqueous solution was added. From this suspension the boron containing zeolitic material having a BEA framework structure was separated by filtration. The filter cake was then washed with de-ionized water at room temperature until the washing water had a conductivity of less than 150 microSiemens/cm.

640 kg of the thus obtained filter cake were suspended in water to obtain a suspension having a solid content of 35 weight-%. This suspension was subjected to spray-drying in a spray-tower with the following spray-drying conditions:
    drying gas, nozzle gas: technical nitrogen
    temperature drying gas:
        temperature spray tower (in): 235° C.
        temperature spray tower (out): 140° C.
    nozzle:
        top-component nozzle supplier Gerig; size 0
        nozzle gas temperature: room temperature
        nozzle gas pressure: 1 bar
    operation mode: nitrogen straight
    apparatus used: spray tower with one nozzle
    configuration: spray tower-filter-scrubber
    gas flow: 1,500 kg/h
    filter material: Nomex® needle-felt 20 m$^2$
    dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 500° C. for 5 h. The B content of the obtained solid, calculated as element, was 1.5 weight-%, the Si content, calculated as element, was 43 weight-%.

6.2 Deboronation 840 kg de-ionized water were provided in a vessel equipped with a reflux condenser. Under stirring at 40 rpm, 28 kg of the spray-dried material obtained according to 6.1 were employed. Subsequently, the vessel was closed and the reflux condenser put into operation. The stirring rate was increased to 70 rpm. Under stirring at 70 rpm, the content of the vessel was heated to 100° C. within 1 h and kept at this temperature for 20 h. Then, the content of the vessel was cooled to a temperature of less than 50° C.

The resulting deboronated zeolitic material of framework structure type BEA was separated from the suspension by filtration under a nitrogen pressure of 2.5 bar and washed four times with deionized water at room temperature. After the filtration, the filter cake was dried in a nitrogen stream for 6 h. Then, the filter cake was mixed with water to obtain a suspension having a solid content of 40 weight-%. Thus suspension was subjected to spray-drying under the conditions as described in 76.1.

The spray-dried material was then subjected to calcination at 550° C. for 5 h (heating ramp 2 K/min). The B content of the obtained solid, calculated as element, was less than 0.03 weight-%, the Si content, calculated as element, was 45 weight-%.

Example 7

Deboronation of B-CHA Zeolitic Materials 7.1 Preparation of a B-CHA Material (Zeolitic Material of Framework Structure CHA)

Based on a synthesis mixture of 1414 g de-ionized water were provided in a vessel, 203.8 g of a 25 weight-% aqueous tetramethylammonium hydroxide solution, 765.7 g of a 13.26 weight-% aqueous trimethyl-1-adamantylammonium hydroxide solution, 31.0 g boric acid, 999.6 g Ludox® AS40, and 20 g seed material, a B-CHA zeolite was synthesized under hydrothermal conditions at a temperature of 160° C. for 72 h under stirring at 200 r.p.m. In the autoclave used, the pressure was 5 bar. At the end of the synthesis procedure, the pH of the synthesis mixture was 11.8.

3,340 g of the suspension obtained from crystallization were subjected to filtration and washed with deionized water until the conductivity of the washing water water was less than 50 microSiemens/cm. 853 g of the wet filter cake were dried for 5 h at 120° C. The B content of the obtained solid, calculated as element, was 1.1 weight-%, the Si content, calculated as element, was 42 weight-%.

7.2 Deboronation 750 g de-ionized water were provided in a vessel equipped with a reflux condenser. Under stirring at 40 rpm, 50 kg of the dried material obtained according to 7.1 were employed. Subsequently, the vessel was closed and the reflux condenser put into operation. Under stirring, the content of the vessel was heated to 100° C. within 1 h and kept at this temperature for 10 h. Then, the content of the vessel was cooled to a temperature of less than 50° C.

The resulting deboronated zeolitic material of framework structure type CHA was separated from the suspension by filtration and washed with deionized water until the washing water had a conductivity of less than 10 microSiemens/cm. After the filtration, the filter cake was dried at 120° C. overnight. The B content of the obtained solid, calculated as element, was 0.09 weight-%, the Si content, calculated as element, was 44 weight-%.

The XRD pattern of the calcined sample (calcination of the dried material at 600° C. under air) is shown in FIG. 6.

SHORT DESCRIPTION OF THE FIGURES

CITED PRIOR ART

Figure 1:
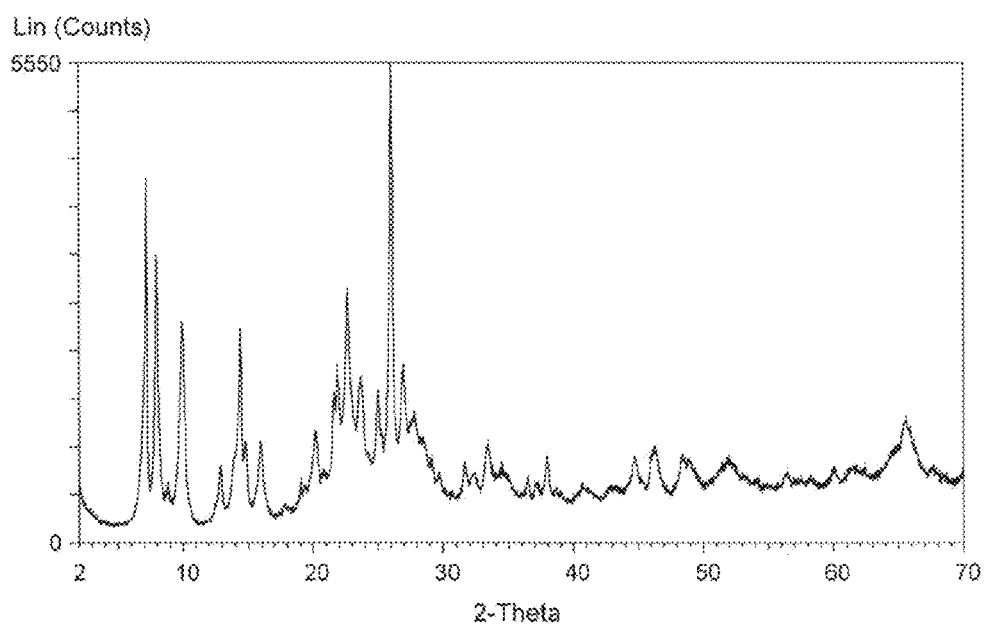
FIG. 1 shows the X-ray diffraction pattern (copper K alpha radiation) of the acid-treated, spray-dried and calcined TiMWW material as obtained according to Example 2. On the x axis, the degree values (2 Theta) are shown, on the y axis, the intensity (Lin (Counts)).
Figure 2:
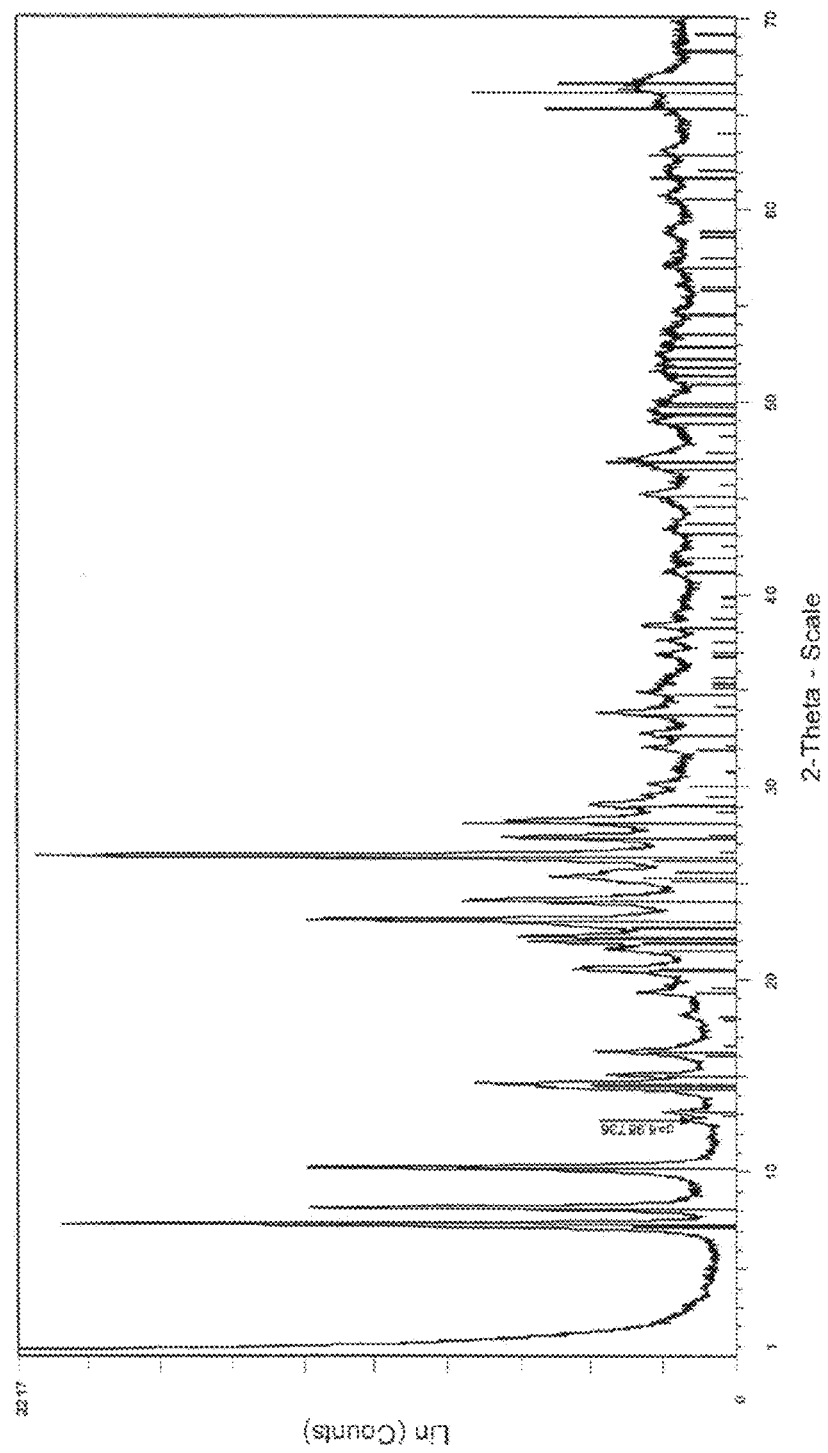
FIG. 2 shows the X-ray diffraction pattern (copper K alpha radiation) of the B-MWW zeolitic material obtained according to Example 3.1. On the x axis, the degree values (2 Theta) are shown, on the y axis, the intensity (Lin (Counts)).
Figure 3:
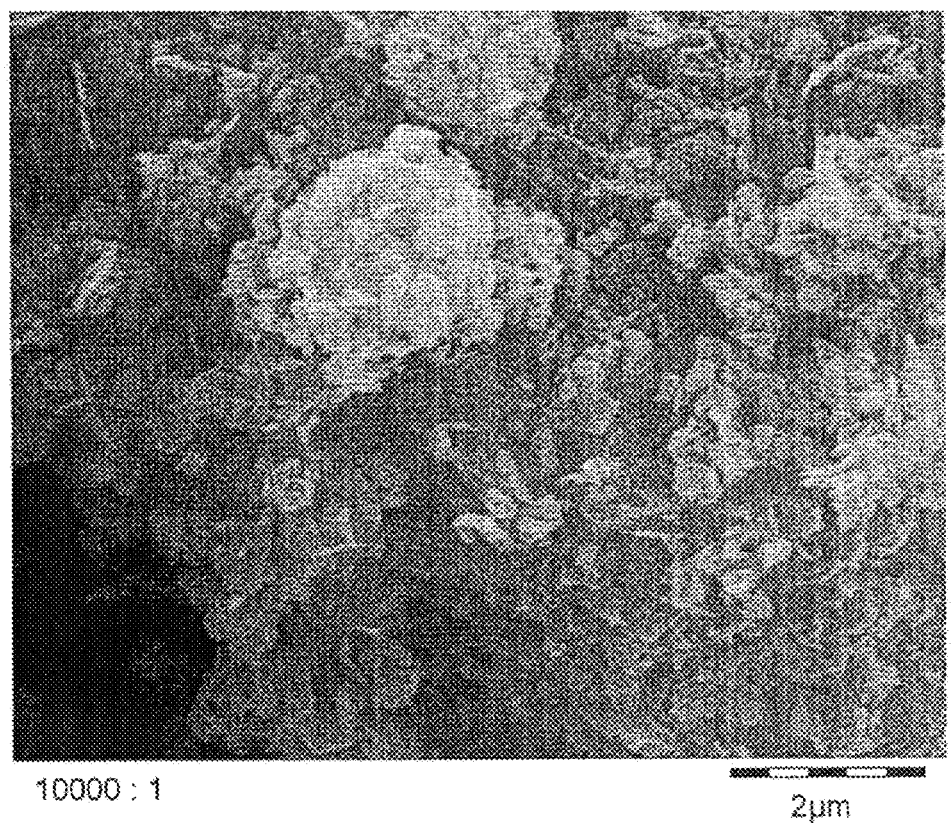
FIG. 3 shows an SEM (Scanning Electron Microscopy) picture (secondary electron (SE) picture at 5 kV (kiloVolt)) of a representative sample of the B-MWW zeolitic material obtained according to Example 3.1. The scale is indicated in the lower right hand corner by the rule having a length of 2 micrometer.
Figure 4:
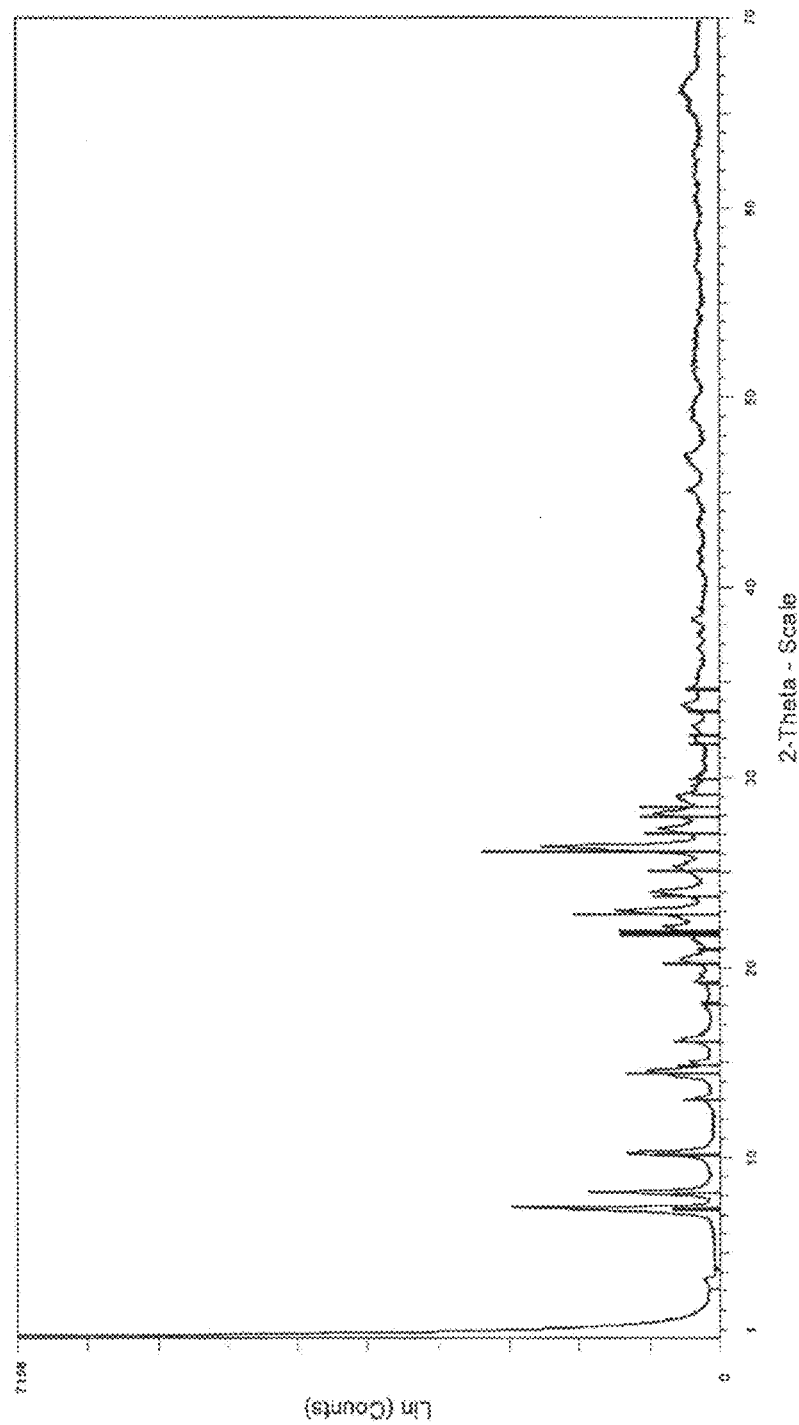
FIG. 4 shows the X-ray diffraction pattern (copper K alpha radiation) of the B-MWW zeolitic material obtained according to Example 3.3. On the x axis, the degree values (2 Theta) are shown, on the y axis, the intensity (Lin (Counts)).
Figure 5:
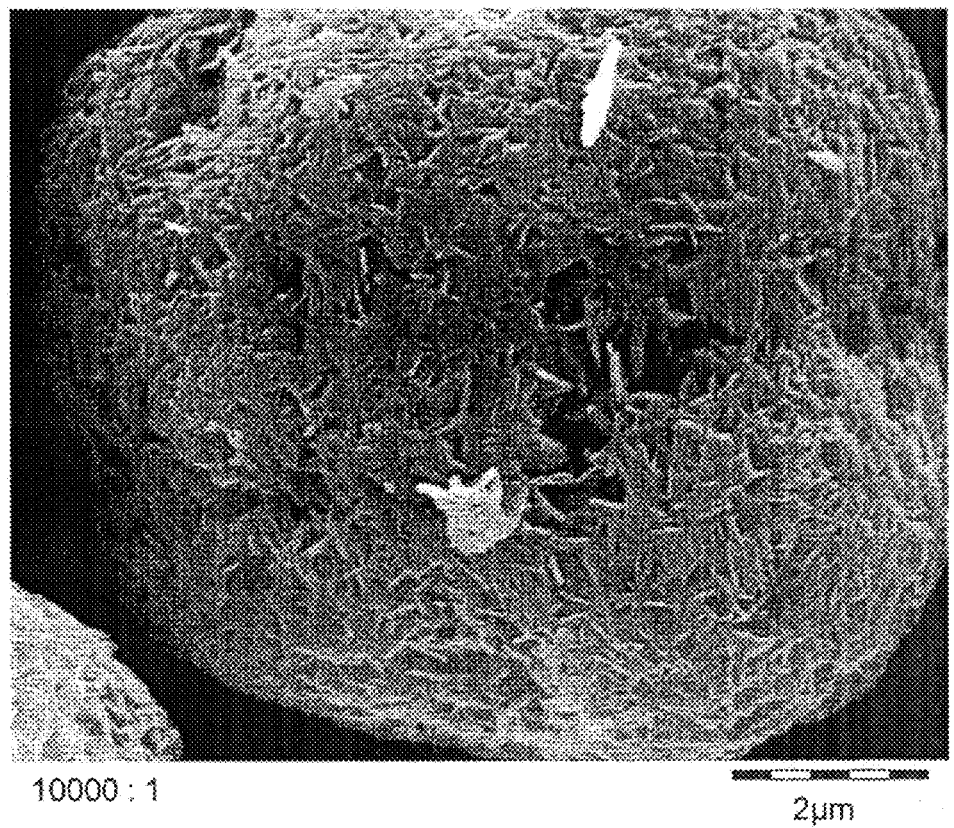
FIG. 5 shows an SEM (Scanning Electron Microscopy) picture (secondary electron (SE) picture at 5 kV (kiloVolt)) of a representative sample of the B-MWW zeolitic material obtained according to Example 3.3. The scale is indicated in the lower right hand corner by the rule having a length of 2 micrometer.
Figure 6:
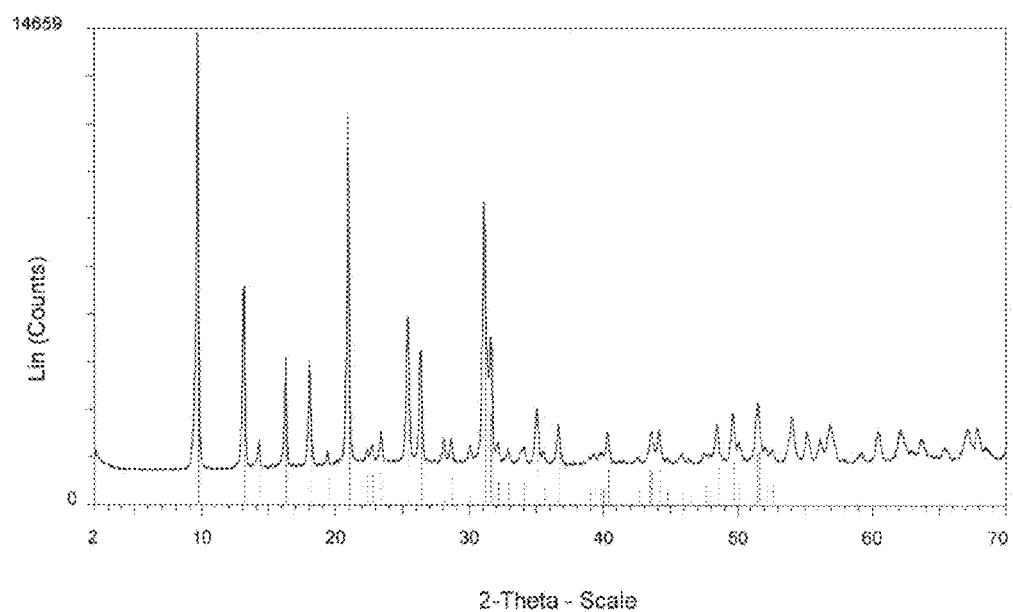
FIG. 6 shows the X-ray diffraction pattern (copper K alpha radiation) of the B-CHA zeolitic material obtained according to Example 7.2. On the x axis, the degree values (2 Theta) are shown, on the y axis, the intensity (Lin (Counts)).

EP 1 485 321 A1
P. Wu et al., Studies in Surface Science and Catalysis, vol. 154 (2004), pp. 2581-2588
WO 02/057181 A2
EP 1 490 300 A1
P. Wu et al., Chemical Communications (2002), pp. 1026-1027
L. Liu et al., Microporous and Mesoporous Materials vol. 94 (2006) pp. 304-312.
EP 1 324 948 A1
U.S. Pat. No. 4,954,325
M. E. Leonowicz, J. A. Lawton, S. L. Lawton, M. K. Rubin, Science, vol. 264 (1994) pp. 1910,
S. L. Lawton et al., Micropor. Mesopor. Mater., Vol. 23 (1998) pp. 109.

P. Wu et al., Hydrothermal Synthesis of a novel Titanosilicate with MWW Topology, Chemistry Letters (2000), pp. 774-775

WO 02/28774 A2

The invention claimed is:

1. A process for the preparation of a zeolitic material, comprising
    (i) providing a boron-containing zeolitic material (B-Zeolite);
    (ii) deboronating the B-Zeolite with a liquid solvent system at a temperature in the range of from 50 to 125° C. thereby obtaining a deboronated B-Zeolite (Zeolite);
    wherein the boron-containing zeolitic material B-Zeolite provided in (i) is a boron-containing zeolitic material of the structure MWW (B-MWW),
    wherein the deboronated B-Zeolite (Zeolite) obtained in (ii) is a deboronated B-MWW (MWW);
    wherein the liquid solvent system is selected from the group consisting of water, monohydric alcohols, polyhydric alcohols, and mixtures of two or more thereof, and
    wherein said liquid solvent system does not contain an inorganic acid.

2. The process of claim 1, wherein in (i), the boron-containing zeolitic material B-Zeolite is provided by a process comprising
    (a) hydrothermally synthesizing the B-Zeolite from a synthesis mixture containing at least one silicon source, at least one boron source, and at least one template compound, to obtain the B-Zeolite in its mother liquor;
    (b) separating the B-Zeolite from its mother liquor;
    (c) drying the B-Zeolite separated according to (b);
    (d) calcining the B-Zeolite obtained from (b) or (c), preferably at a temperature in the range of from 500 to 700° C.

3. The process of claim 2 wherein the calcining of step (d) is at a temperature in the range of from 500 to 700° C.

4. The process of claim 1, wherein in (i), the boron-containing zeolitic material is B-MWW, provided by a process comprising
    (a) hydrothermally synthesizing a B-MWW precursor from a synthesis mixture containing ammonia stabilized colloidal silica as at least one silicon source, boric acid as at least one boron source, and at least one template compound selected from the group consisting of piperidine, hexamethylene imine, and a mixture thereof, to obtain the B-MWW precursor in its mother liquor;
    (b) separating the B-MWW from its mother liquor;
    (c) spray-drying the B-MWW precursor separated according to (b);
    (d) calcining the B-MWW precursor obtained from (c) at a temperature in the range of from 500 to 700° C., obtaining the B-MWW.

5. The process of claim 1, wherein the B-Zeolite provided in (i) is an aluminum-free zeolitic material.

6. The process of claim 1, wherein the B-Zeolite provided in (i) has a B content in the range of from 0.5 to 5.0 weight-%, calculated as element and based on the total weight of the B-Zeolite.

7. The process of claim 1, wherein the B-Zeolite provided in (i) is provided in the form of a spray-powder or a spray-granulate.

8. The process of claim 1, wherein the liquid solvent system does not contain an inorganic or organic acid, or a salt thereof.

9. The process of claim 1, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof.

10. The process of claim 1, wherein the liquid solvent system is water.

11. The process of claim 1, wherein the deboronating according to (ii) is carried out for a time in the range of from 6 to 20 h.

12. The process of claim 1, wherein in the deboronating according to (ii), the weight ratio of B-Zeolite relative to the liquid solvent system is in the range of from 1:5 to 1:40.

13. The process of claim 1, wherein during the deboronation according to (ii), the liquid solvent system is stirred.

14. The process of claim 1, wherein the liquid solvent system is water and the deboronating according to (ii) is carried out at a temperature in the range of from 95 to 105° C. for a time in the range of from 8 to 15 h, wherein the deboronating according to (ii) is carried out under reflux.

15. The process of claim 1, and wherein the Zeolite obtained in (ii) has a B content of at most 0.2 weight-%, calculated as element and based on the total weight of the Zeolite.

16. The process of claim 1, further comprising
    (iii) post-treating the Zeolite obtained from (ii) by a process comprising
        (iii.1) separating the Zeolite from the liquid solvent system;
        (iii.2) drying the separated Zeolite.

17. The process of claim 16, wherein in (iii.2), the separated Zeolite is dried by spray-drying.

18. The process of claim 16, further comprising
    (iii.3) calcining the Zeolite obtained from (iii.2) at temperatures in the range of from 500 to 700° C.

19. A zeolitic material, obtainable or obtained by a process according to claim 1 or 18.

20. A deboronated zeolitic material (Zeolite), containing at most 0.2 weight-% boron, calculated as element and based on the total weight of the Zeolite;
    wherein the Zeolite has a structure of MWW.

21. The zeolitic material of claim 20, which zeolitic material is in the form of a spray-powder or a spray-granulate.

22. The zeolitic material according to claim 20, which is
    a catalytically active agent,
    a precursor for the preparation of a catalytically active agent,
    a catalyst component, or
    a component of a washcoat applied on a carrier.

* * * * *